(12) United States Patent
Gallo

(10) Patent No.: US 9,304,837 B2
(45) Date of Patent: Apr. 5, 2016

(54) CELLULAR USER INTERFACE

(75) Inventor: Anthony Carmen Gallo, Ontario, CA (US)

(73) Assignee: Open Text S.A., Luxembourg (LU)

( * ) Notice: Subject to any disclaimer, the term of this patent is extended or adjusted under 35 U.S.C. 154(b) by 602 days.

(21) Appl. No.: 13/174,543

(22) Filed: Jun. 30, 2011

(65) Prior Publication Data

US 2011/0283208 A1    Nov. 17, 2011

Related U.S. Application Data

(63) Continuation of application No. 11/281,043, filed on Nov. 16, 2005, now Pat. No. 8,001,476.

(60) Provisional application No. 60/628,939, filed on Nov. 16, 2004.

(51) Int. Cl.
*G06F 3/00* (2006.01)
*G06F 9/54* (2006.01)
(Continued)

(52) U.S. Cl.
CPC .............. *G06F 9/542* (2013.01); *G06F 9/4443* (2013.01); *G06F 3/0484* (2013.01)

(58) Field of Classification Search
CPC .................................................. G06F 3/0484
USPC .......... 715/742, 717, 771, 804, 788, 736, 738
See application file for complete search history.

(56) References Cited

U.S. PATENT DOCUMENTS

| | | |
|---|---|---|
| 4,845,645 A | 7/1989 | Matin et al. |
| 5,043,919 A | 8/1991 | Callaway et al. |

(Continued)

FOREIGN PATENT DOCUMENTS

| | | |
|---|---|---|
| DE | 195 23 483 | 1/1997 |
| EP | 0 428 135 | 5/1991 |

(Continued)

OTHER PUBLICATIONS

Baudisch, P. et al., "Collapse-to-zoom: Viewing Web Pages on Small Screen Devices by Interatively Removing Irrelevant Content," *Proceedings of the 17th Annual ACM Symposium on User Interface Software and Technology*, Oct. 24-27, 2004, vol. 6, Issue 2, Santa Fe, New Mexico, USA, four pages.

(Continued)

*Primary Examiner* — Steven B Theriault
(74) *Attorney, Agent, or Firm* — Sprinkle IP Law Group

(57) ABSTRACT

Configurations for a cellular user interface are provided. In one embodiment, a client configuration includes a viewer and a content development kit. A content server distributes cellularized content among several client viewers. Connectors in a scheduled configuration regularly acquire updated content from data sources. An integration server interfaces between the connectors and the content server for distributing content. A monitoring agent assists with content updating upon detecting source changes. A registration server enables cell content update in client viewers through the content server. Cells in the cellularized environment include a visual proxy component and a metadata component. The visual proxy component can be configured for displaying different content at various levels of detail. The metadata component enables intelligent organization and display of content through queries, channels, and data updates. In addition, procedural geometry in the cellularized environment automates the content presentation and provides a flexible arrangement of the cells.

26 Claims, 16 Drawing Sheets

(51) Int. Cl.
*G06F 9/44* (2006.01)
*G06F 3/0484* (2013.01)

(56) References Cited

U.S. PATENT DOCUMENTS

| | | | |
|---|---|---|---|
| 5,060,170 A | 10/1991 | Bourgeois et al. | |
| 5,293,615 A | 3/1994 | Amada | |
| 5,341,466 A | 8/1994 | Perlin et al. | |
| 5,363,482 A | 11/1994 | Victor et al. | |
| 5,491,780 A | 2/1996 | Fyles et al. | |
| 5,500,935 A | 3/1996 | Moran et al. | |
| 5,544,354 A | 8/1996 | May et al. | |
| 5,564,112 A | 10/1996 | Hayes et al. | |
| 5,572,643 A | 11/1996 | Judson | |
| 5,704,050 A | 12/1997 | Redpath | |
| 5,712,995 A | 1/1998 | Cohn | |
| 5,715,453 A | 2/1998 | Stewart | |
| 5,721,853 A | 2/1998 | Smith | |
| 5,764,908 A | 6/1998 | Shoji et al. | |
| 5,764,916 A | 6/1998 | Busey et al. | |
| 5,771,042 A | 6/1998 | Santos-Gomez | |
| 5,774,660 A | 6/1998 | Brendel et al. | |
| 5,781,189 A | 7/1998 | Holleran et al. | |
| 5,796,402 A | 8/1998 | Ellison-Taylor | |
| 5,798,752 A | 8/1998 | Buxton et al. | |
| 5,801,698 A | 9/1998 | Lection et al. | |
| 5,802,253 A | 9/1998 | Gross et al. | |
| 5,805,167 A | 9/1998 | Van Cruyningen | |
| 5,809,242 A | 9/1998 | Shaw et al. | |
| 5,812,769 A | 9/1998 | Graber et al. | |
| 5,819,055 A | 10/1998 | MacLean et al. | |
| 5,838,318 A | 11/1998 | Porter et al. | |
| 5,842,218 A | 11/1998 | Robinson | |
| 5,847,706 A | 12/1998 | Kingsley | |
| 5,852,809 A | 12/1998 | Abel et al. | |
| 5,893,091 A | 4/1999 | Hunt et al. | |
| 5,913,040 A | 6/1999 | Rakavy et al. | |
| 5,920,315 A | 7/1999 | Santos-Gomez | |
| 5,933,811 A | 8/1999 | Angles et al. | |
| 5,949,418 A | 9/1999 | Shields et al. | |
| 5,959,621 A | 9/1999 | Nawaz et al. | |
| 5,960,409 A | 9/1999 | Wexler | |
| 5,970,469 A | 10/1999 | Scroggie et al. | |
| 5,974,451 A | 10/1999 | Simmons | |
| 5,986,654 A | 11/1999 | Alexander et al. | |
| 5,995,943 A | 11/1999 | Bull et al. | |
| 5,996,007 A | 11/1999 | Klug et al. | |
| 6,008,809 A | 12/1999 | Brooks | |
| 6,034,661 A | 3/2000 | Servan-Scheiber et al. | |
| 6,037,937 A | 3/2000 | Beaton et al. | |
| 6,076,104 A | 6/2000 | McCue | |
| 6,088,708 A | 7/2000 | Burch et al. | |
| 6,097,387 A | 8/2000 | Sciammarella et al. | |
| 6,112,212 A | 8/2000 | Heitler | |
| 6,122,647 A | 9/2000 | Horowitz et al. | |
| 6,141,007 A | 10/2000 | Lebling et al. | |
| 6,154,205 A | 11/2000 | Carroll et al. | |
| 6,166,736 A | 12/2000 | Hugh | |
| 6,185,589 B1 | 2/2001 | Votipka | |
| 6,195,094 B1 | 2/2001 | Celebiler | |
| 6,233,600 B1 | 5/2001 | Salas et al. | |
| 6,246,411 B1 | 6/2001 | Strauss | |
| 6,248,946 B1 | 6/2001 | Dwek | |
| 6,275,829 B1 | 8/2001 | Angiulo et al. | |
| 6,300,947 B1 | 10/2001 | Kanevsky | |
| 6,310,631 B1 | 10/2001 | Cecco et al. | |
| 6,313,853 B1 | 11/2001 | Lamontagne et al. | |
| 6,353,442 B1 | 3/2002 | Masui | |
| 6,377,285 B1 | 4/2002 | Doan et al. | |
| 6,380,940 B1 | 4/2002 | Halstead et al. | |
| 6,414,698 B1 | 7/2002 | Lovell et al. | |
| 6,415,305 B1 | 7/2002 | Agrawal et al. | |
| 6,459,442 B1 | 10/2002 | Edwards et al. | |
| 6,462,759 B1 | 10/2002 | Kurtzberg et al. | |
| 6,603,493 B1 | 8/2003 | Lovell et al. | |
| 6,628,313 B1 | 9/2003 | Minakuchi et al. | |
| 6,636,246 B1 * | 10/2003 | Gallo et al. | 715/805 |
| 6,639,611 B1 | 10/2003 | Leduc | |
| 6,647,534 B1 | 11/2003 | Graham | |
| 6,650,998 B1 | 11/2003 | Rutledge et al. | |
| 6,661,436 B2 | 12/2003 | Barksdale et al. | |
| 6,671,853 B1 | 12/2003 | Burkett et al. | |
| 6,675,351 B1 | 1/2004 | Leduc | |
| 6,684,087 B1 | 1/2004 | Yu et al. | |
| 6,697,033 B1 | 2/2004 | Leung et al. | |
| 6,704,024 B2 | 3/2004 | Robotham et al. | |
| 6,724,403 B1 * | 4/2004 | Santoro et al. | 715/765 |
| 6,731,316 B2 | 5/2004 | Herigstad et al. | |
| 6,747,680 B1 | 6/2004 | Igarashi et al. | |
| 6,825,860 B1 | 11/2004 | Hu et al. | |
| 6,832,353 B2 | 12/2004 | Itavaara et al. | |
| 6,865,719 B1 | 3/2005 | Nicholas | |
| 6,882,755 B2 | 4/2005 | Silverstein et al. | |
| 6,919,890 B2 | 7/2005 | Halstead | |
| 6,928,436 B2 | 8/2005 | Baudel | |
| 6,938,221 B2 | 8/2005 | Nguyen | |
| 6,993,726 B2 | 1/2006 | Rosenholtz et al. | |
| 7,013,435 B2 * | 3/2006 | Gallo et al. | 715/850 |
| 7,027,052 B1 | 4/2006 | Thorn et al. | |
| 7,051,276 B1 | 5/2006 | Mogilevsky et al. | |
| 7,055,110 B2 | 5/2006 | Kupka | |
| 7,065,707 B2 | 6/2006 | Chen et al. | |
| 7,069,506 B2 | 6/2006 | Rosenholtz et al. | |
| 7,076,742 B1 | 7/2006 | Thorn et al. | |
| 7,143,347 B2 | 11/2006 | Su | |
| 7,165,228 B2 | 1/2007 | Taylor et al. | |
| 7,203,901 B2 | 4/2007 | Chen et al. | |
| 7,210,107 B2 | 4/2007 | Wecker et al. | |
| 7,222,306 B2 | 5/2007 | Kaasila et al. | |
| 7,228,492 B1 | 6/2007 | Graham | |
| 7,246,306 B2 | 7/2007 | Chen et al. | |
| 7,248,262 B2 | 7/2007 | Cao | |
| 7,262,811 B2 | 8/2007 | Burke | |
| 7,310,779 B2 | 12/2007 | Carro | |
| 7,325,198 B2 | 1/2008 | Adcock et al. | |
| 7,327,349 B2 | 2/2008 | Robbins et al. | |
| 7,412,650 B2 * | 8/2008 | Gallo | 715/700 |
| 7,432,984 B2 | 10/2008 | Oh | |
| 7,434,174 B2 | 10/2008 | Sellers et al. | |
| 7,461,353 B2 | 12/2008 | Rohrabaugh et al. | |
| 7,487,447 B1 | 2/2009 | Jerger | |
| 7,599,988 B2 | 10/2009 | Frank | |
| 7,644,376 B2 | 1/2010 | Karachale et al. | |
| 8,001,476 B2 | 8/2011 | Gallo | |
| 8,090,776 B2 | 1/2012 | Torres et al. | |
| 8,418,075 B2 | 4/2013 | Gallo et al. | |
| 8,793,604 B2 | 7/2014 | Gallo et al. | |
| 2001/0028369 A1 | 10/2001 | Gallo et al. | |
| 2001/0030667 A1 | 10/2001 | Kelts | |
| 2001/0035885 A1 | 11/2001 | Iron et al. | |
| 2002/0000998 A1 | 1/2002 | Scott et al. | |
| 2002/0033837 A1 | 3/2002 | Munro | |
| 2002/0089549 A1 | 7/2002 | Munro et al. | |
| 2002/0112237 A1 | 8/2002 | Kelts | |
| 2002/0118226 A1 | 8/2002 | Hough et al. | |
| 2002/0133627 A1 | 9/2002 | Maes et al. | |
| 2002/0143826 A1 | 10/2002 | Day et al. | |
| 2002/0149605 A1 | 10/2002 | Grossman | |
| 2002/0154168 A1 | 10/2002 | Ijas et al. | |
| 2002/0184111 A1 | 12/2002 | Swanson | |
| 2002/0191028 A1 | 12/2002 | Senechalle et al. | |
| 2002/0196287 A1 | 12/2002 | Taylor et al. | |
| 2003/0052912 A1 | 3/2003 | Bowman, Jr. et al. | |
| 2003/0179189 A1 | 9/2003 | Lira | |
| 2003/0179239 A1 | 9/2003 | Lira | |
| 2003/0182628 A1 | 9/2003 | Lira | |
| 2003/0204536 A1 * | 10/2003 | Keskar et al. | 707/200 |
| 2003/0229900 A1 | 12/2003 | Reisman | |
| 2004/0003097 A1 | 1/2004 | Willis et al. | |
| 2004/0008224 A1 | 1/2004 | Molander et al. | |
| 2004/0012626 A1 | 1/2004 | Brookins | |
| 2004/0044499 A1 | 3/2004 | House et al. | |
| 2004/0054968 A1 | 3/2004 | Savage | |
| 2004/0100509 A1 | 5/2004 | Sommerer et al. | |

(56) References Cited

U.S. PATENT DOCUMENTS

| | | | |
|---|---|---|---|
| 2004/0109031 | A1 | 6/2004 | Deaton et al. |
| 2004/0128353 | A1 | 7/2004 | Goodman et al. |
| 2004/0133848 | A1 | 7/2004 | Hunt et al. |
| 2004/0135824 | A1 | 7/2004 | Fitzmaurice |
| 2004/0160462 | A1 | 8/2004 | Sheasby et al. |
| 2004/0168115 | A1 | 8/2004 | Bauernschmidt et al. |
| 2004/0205536 | A1 | 10/2004 | Newman et al. |
| 2004/0215657 | A1* | 10/2004 | Drucker et al. ............ 707/104.1 |
| 2004/0233222 | A1 | 11/2004 | Lee et al. |
| 2004/0252119 | A1 | 12/2004 | Hunleth et al. |
| 2004/0267730 | A1* | 12/2004 | Dumais et al. .................... 707/3 |
| 2005/0022116 | A1 | 1/2005 | Bowman et al. |
| 2005/0065913 | A1 | 3/2005 | Lillie et al. |
| 2005/0081241 | A1 | 4/2005 | Chen |
| 2005/0086612 | A1 | 4/2005 | Gettman et al. |
| 2005/0097008 | A1 | 5/2005 | Ehring et al. |
| 2005/0097444 | A1 | 5/2005 | Ivarsey et al. |
| 2005/0116966 | A1 | 6/2005 | Graham et al. |
| 2005/0149879 | A1 | 7/2005 | Jobs et al. |
| 2005/0149880 | A1* | 7/2005 | Postrel .......................... 715/808 |
| 2005/0151884 | A1 | 7/2005 | Oh |
| 2005/0166158 | A1 | 7/2005 | Blanchard et al. |
| 2005/0195221 | A1 | 9/2005 | Berger et al. |
| 2005/0210399 | A1 | 9/2005 | Filner et al. |
| 2006/0020903 | A1 | 1/2006 | Wang et al. |
| 2006/0026013 | A1* | 2/2006 | Kraft ................................ 705/1 |
| 2006/0036955 | A1 | 2/2006 | Baudisch et al. |
| 2006/0064647 | A1 | 3/2006 | Tapuska et al. |
| 2006/0085767 | A1 | 4/2006 | Hinckley et al. |
| 2006/0156228 | A1 | 7/2006 | Gallo et al. |
| 2006/0195782 | A1 | 8/2006 | Wang et al. |
| 2006/0200779 | A1 | 9/2006 | Taylor |
| 2006/0242557 | A1 | 10/2006 | Nortis |
| 2006/0256130 | A1 | 11/2006 | Gonzalez |
| 2006/0265669 | A1 | 11/2006 | Lee |
| 2006/0268100 | A1 | 11/2006 | Karukka et al. |
| 2007/0038643 | A1 | 2/2007 | Epstein |
| 2007/0050708 | A1 | 3/2007 | Gupta et al. |
| 2007/0198917 | A1 | 8/2007 | Rohrabaugh et al. |
| 2007/0206221 | A1 | 9/2007 | Wyler et al. |
| 2007/0288841 | A1 | 12/2007 | Rohrabaugh et al. |
| 2007/0288855 | A1 | 12/2007 | Rohrabaugh et al. |
| 2008/0028335 | A1 | 1/2008 | Rohrabaugh et al. |
| 2008/0144107 | A1 | 6/2008 | Lieb |
| 2014/0310308 | A1 | 10/2014 | Gallo et al. |

FOREIGN PATENT DOCUMENTS

| | | |
|---|---|---|
| EP | 1195664 | 4/2002 |
| GB | 2 303 231 | 2/1997 |
| WO | WO 96/07958 | 3/1996 |
| WO | WO 01/80098 | 10/2001 |

OTHER PUBLICATIONS

Bederson, B.B. et al., "Implementing a Zooming User Interface: Experience Building Pad++," thirty-four pages. [Online] [Retrieved on Apr. 20, 2006] Retrieved from the Internet <URL:http://http://mrl.nyu.edu/publications/zooming/zooming.pdf>.

Bederson, B.B. et al., "Pad++: A Zoomable Graphical Sketchpad for Exploring Alternate Interface Physics," Sep. 19, 1995, thirty pages. [Online] [Retrieved on Apr. 20, 2006] Retrieved from the Internet <URL:http://mrl.nyu.edu/publications/jvlc-96-pad/jvlc-96-pad.pdf>.

Google Earth, "Google Earth—Explore, Search and Discover," 2006, one page. [Online] [Retrieved on Apr. 24, 2006] Retrieved from the Internet <URL:http://earth.google.com/>.

Herot, C.F., "Spatial Management of Data," *ACM Transactions on Database Systems*, Dec. 1980, pp. 493-513, vol. 5, No. 4.

Human-Computer Interaction Lab / University of Marlyand, "Piccolo Patterns," seventeen pages. [Online] [Retrieved on Apr. 20, 2006] Retrieved from the Internet <URL:http://www.cs.umd.edu/hcil/piccolo/learn/patterns.shtml>.

New York University Media Research Lab, "Zooming Applet," 1997, one page. [Online] [Retrieved o Apr. 20, 2006] Retrieved from the Internet <URL:http://mrl.nyu.edu/~perlin/zoom/TestButton.html>.

Perlin, K. et al., "Pad: An Alternative Approach to the Computer Interface," eleven pages. [Online] [Retrieved on Apr. 20, 2006] Retrieved from the Internet <URL:http://mrl.nyu.edu/publications/sig93-pad/siggraph-93-origpad.pdf>.

Shannon, R., "DHTML Explained," Oct. 3, 2003, three pages. [Online] [Retrieved Dec. 3, 2009] Retrieved from the Internet <URL:http://web.archive.org/web/20031003023520/http://www.yourhtmlsource.com>.

Wikipedia, "RSS (file format)," eight pages. [Online] [Retrieved on Apr. 20, 2006] Retrieved from the Internet <URL:http://en.wikipedia.org/wiki/Rss_feeds>.

Wikipedia, "Web Feed," two pages. [Online] [Retrieved on Apr. 20, 2006] Retrieved from the Internet <URL:http://en.wikipedia.org/wiki/Web_feed>.

Wikipedia, "Zooming User Interface," one page. [Online] [Retrieved on Apr. 20, 2006] Retrieved from the Internet <URL:http://en.wikipedia.org/wiki/Zooming_user_interface>.

United States Patent and Trademark Office, Final Rejection, U.S. Appl. No. 11/281,924, filed Aug. 7, 2012, 56 pages.

International Search Report and Written Opinion for International Patent Application No. PCT/US2005/020514, dated Jun. 29, 2006, 9 pgs.

Office Action for U.S. Appl. No. 11/281,924, mailed Jan. 28, 2008, 35 pgs.

Office Action for U.S. Appl. No. 11/281,043, mailed Apr. 17, 2008, 18 pgs.

Office Action for 11/281,924, mailed Oct. 3, 2008, 45 pgs.

Office Action for U.S. Appl. No. 11/281,043, mailed Jan. 21, 2009, 16 pgs.

Office Action for U.S. Appl. No. 11/281,924, mailed May 11, 2009, 40 pgs.

Office Action for U.S. Appl. No. 11/281,043, mailed Sep. 1, 2009, 16 pgs.

Office Action for U.S. Appl. No. 11/281,924, mailed Dec. 8, 2009, 39 pgs.

Office Action for U.S. Appl. No. 11/281,043, mailed Apr. 27, 2010, 17 pgs.

Office Action for U.S. Appl. No. 11/281,924, mailed Jul. 22, 2010, 44 pgs.

Office Action for U.S. Appl. No. 11/281,924, mailed Jan. 5, 2011, 41 pgs.

Office Action for U.S. Appl. No. 11/281,924, mailed Jul. 21, 2011, 44 pgs.

Office Action for U.S. Appl. No. 13/787,403, mailed Aug. 30, 2013, 15 pgs.

* cited by examiner

CELLULAR USER INTERFACE

RELATED APPLICATIONS

This application is a continuation of U.S. application Ser. No. 11/281,043, entitled "Cellular User Interface" which was filed on Nov. 16, 2005, now U.S. Pat. No. 8,001,476, which claims priority to U.S. Provisional Patent Application Ser. No. 60/628,939 entitled "Interactive Content Development, Management, and Presentation" and filed on Nov. 16, 2004, which is incorporated herein by reference. This application is related to co-pending U.S. patent application Ser. No. 11/281,924, entitled "Spatially Driven Content Presentation in a Cellular Environment" filed on Nov. 16, 2005, now U.S. Pat. No. 8,418,075 which is incorporated herein by reference.

FIELD OF THE INVENTION

The present invention relates generally to graphical user interfaces for computing devices and more particularly to a cellularized graphical user interface.

BACKGROUND OF THE INVENTION

Conventional graphical user interfaces ("GUIs") of computer software applications are typically a result of interaction between the software application and the underlying operating system ("OS") of the machine in which the application is run. The OS provides mechanisms for applications to display information to the user through a hardware display. For example, in Microsoft® Windows based computer systems, applications interact with the Windows™ application programming interface ("API") to display application output to a screen using OS window display elements, e.g., windows, buttons, menus, and the like.

Using this conventional approach, the microprocessor(s) in the computer system executes application code to produce application related results and additionally executes OS operations to generate display elements in which to place the application output. The microprocessor executes software instructions to generate the output graphics and sends them to the graphics hardware for display on the computer monitor or screen. Accordingly, conventional graphical user interfaces require significant computing resources to generate and display the output graphics associated with applications. In addition, the microprocessor is also tasked with executing the application functional code to produce the results that are then displayed.

These conventional GUI processes greatly reduce the processing speed for both the display of output graphics and the execution of the application functional code. This slowdown is most noticeable when multiple applications are executing simultaneously in a multi-tasking computer system. The OS-generated output windows for each of the active applications are being generated and refreshed through processes executing in the same microprocessor(s) that are executing all the functional code of the active applications. As the limits in the computing resources of the system are reached, the graphical display in the computer monitor shows the performance degradation by failing to properly refresh window content, creating ghost windows, failing to respond to user commands, and the like.

This type of performance degradation is most noticeable when multiple applications are executed that generate multimedia, graphics-rich output data. For example, digital photo or video software applications, e.g., video feeds, movies, or the like, consume much of the microprocessor computing resources and typically cause window operations, such as minimizing, resizing, and the like, to lag from the time the user input is received by the OS. Accordingly, it is desirable to provide a mechanism for the display of multiple output graphics offloading the output generation from the main processor.

In addition, conventional GUIs do not provide functional interactions with the display windows based on content relationships between the windows of different applications. Each application, through the OS API, generally controls the display of its user interface independently from other applications. The user may interact with the OS to physically move or resize windows within the display area of the monitor(s) but there is no mechanism provided in the OS or otherwise to exploit relationships between content being displayed in different windows from independent applications. It would be desirable to enable users to intuitively interact with displayed content by exploiting content relationships regardless of the source application responsible for generating the content.

The problems resulting from the current inability of conventional user interfaces to support management of the user interface environment in response to content relationships between different applications become particularly acute in enterprises that utilize many different sources of data and applications to make business, analytical, financial, emergency, health, or other types of complex decisions. For example, it is not unusual for a business to have multiple different databases managing its inventory, accounting, sales, manufacturing, and technical support systems, as well as completely unrelated applications for accessing such data. A user in such an enterprise will typically have open on his or her computer numerous different ones of these applications while attempting to make business decisions. Conventional operating systems such as Windows™ leave it entirely to the user's own capabilities and decisions to manage where to place the windows for these applications on the screen, which ones to attend to, and how reorganize or reconfigure the application windows in response to changing information. For example, if the user is responsible to update a sales report in response to increases in sales data, the user must monitors sales database in one window, and when the sales data reaches a certain threshold, manually select a reporting application window to update a report.

Accordingly, what is needed is a user-centric graphical user interface that leverages processing capabilities of the graphics hardware and off-system image pre-preprocessing to offload some of the graphics display processing from the microprocessor in the user's device and provides application and hardware independent functionality for content-driven organization and presentation of content to the user.

SUMMARY OF THE INVENTION

A cellularized user interface is a user-centric and content-driven graphical user interface that organizes and presents content for a user. The content presentation is independent from the underlying content-producing applications and from the operating system and hardware providing the display. The cellularized user interface renders visual representations of content in an environment made up of cells. Each cell includes an associated visual proxy component and a content information component. The content information component enables intelligent cell interaction to provide a highly flexible and dynamic content presentation adaptable to user needs and preferences. The cellular user interface is user-centric because it responds to user actions by passively deriving user preferences and needs. The cellularized user interface is also content-driven because any cell (or groups of cells) can programmatically respond to content events and relationships within and between other cells in the user interface environment.

A graphical user interface is provided for interfacing between applications and data sources on the one hand, and the operating system on the other, to display graphical representations of data content from multiple data sources. The graphical user interface includes display cells arranged in a predetermined pattern or patterns. Each cell includes a visual proxy component configured to display a graphical representation of content associated with a data source and a metadata component for providing descriptive information associated with the content.

A method is provided for displaying data content from data sources on a graphical user interface. The graphical user interface acts as an intermediary between the data sources and applications, and an operating system. The method includes associating an output of a data source with a cell-generating connector. A visual proxy for a content output from the data source is rendered for associating with a cell. Metadata associated with the cell is generated, including information descriptive of the content. The cell is then provided to a viewer application and displayed in a cellularized environment of a user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures and the following description describe various embodiments of the present invention by way of illustration only. It should be noted that from the following discussion, alternative embodiments of the structures and methods disclosed herein will be readily recognized as viable alternatives that may be employed without departing from the principles of the claimed invention.

DETAILED DESCRIPTION OF THE INVENTION

Overview of Cellularized User Interface

In order to best explain the features and benefits of the cellularized user interface, an example application will now be described. It will be appreciated that this example is merely illustrative of different implementations of the cellularized user interface, and not therefore limiting of the scope of the invention.

Figure 1:
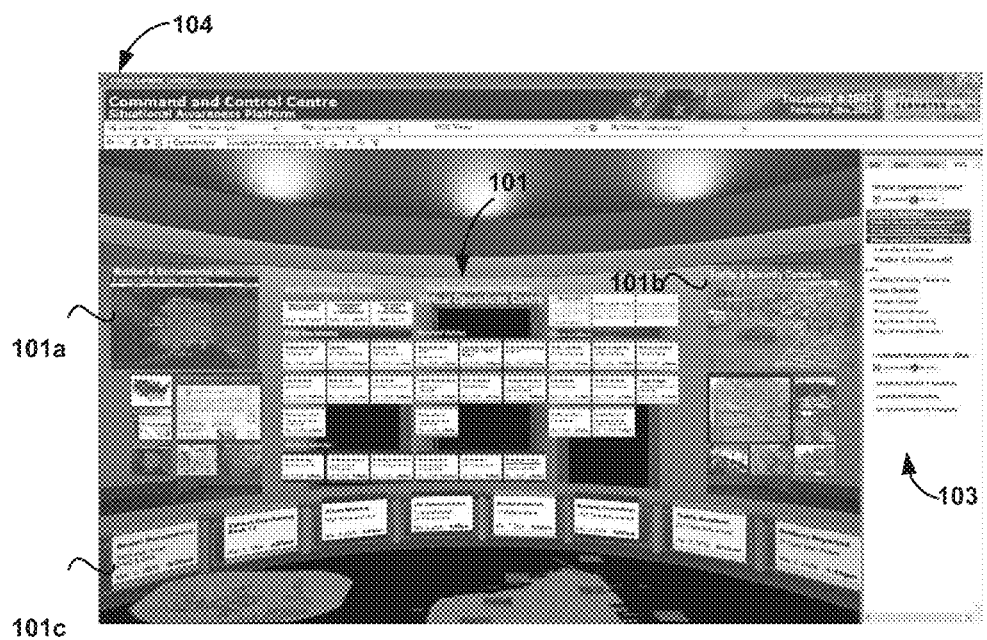
FIG. 1 illustrates a sample graphical user interface providing a situational awareness control center for emergency response.

FIG. 1 shows a sample graphical user interface for an emergency response situational awareness command and control center. Users in this type of command situation face a particular need for monitoring disparate sources of information, typically coming from many different data sources and applications, and making informed, intelligent decisions must be made rapidly.

The cellular environment 100 organizes and displays content in a set of cells 101 for a user. In the example shown in FIG. 1, the content is situational awareness information derived from multiple sources intended for the management of a city's command and control center. Thus, for example, cell 101a displays a visual representation of a Doppler radar image with weather information for the city, with the radar image data being obtained in near real time from a weather data source, such as the National Weather Service. Cell 101b displays a visual representation of a video of a traffic and security camera in an intersection, taken as a live data feed from remotely located traffic and security cameras. Cell 101c displays a visual representation of the status of a sewer reconstruction project in the city, with the data being taken from a legacy database system that manages municipal construction information. Other cells 101 display visual representations of additional situational awareness content, such as traffic, fire, and police reports.

Each of these cells receives its data from the particular legacy data repository and application used by the respective agency (e.g., fire department, police department). The content being displayed through the visual representations of the cells 101 is generated by a plurality of applications. Thus, the weather map of cell 101a may be generated by a satellite imaging application, the traffic video of cell 101b may be generated by a video feed application, and the textual content of cell 101c may be generated by a database interface application. The cellularized environment 100 integrates the data content from multiple sources and multiple different applications and displays it in a unified GUI.

Of particular note is that none of the underlying data sources or applications needs to be specifically modified to cooperate with the cellularized user interface. In conventional operating system-based user interfaces, each application is responsible for and manages the contents and location of its windows and other user interface representations. By contrast, in the cellularized user interface as illustrated, each application and data source operates in its own native manner, and need not have any particular application interface or programmatic awareness of the other data sources or applications or even of the cellularized user interface itself. Instead, the cellularized user interface environment, including the cells themselves, manages the visual representations of content in the cells.

More particularly, underlying metadata associated with the cells 101 is used in the cellular environment 100 to organize the location of cells 101 and inter-relate their content. For example, upon a user's selection of a cell showing the weather forecast for a particular day, a selection of the other cells automatically modify their displayed content to show the calendar of events for that day, images from cameras in locations where those events will take place, recent reports of traffic, fire, and criminal activity in those areas, and the like. Similarly, cells can automatically respond to changes in the content of other cells, even without any user input at all. Thus, if a cell reporting police events outputs a report of a new police report of a robbery at a particular address, then the security and traffic camera cells can automatically respond by switching to a video feed of the respective cameras closest to such address. The particular arrangement, size, orientation of the cells (or any of them) can also dynamically respond to user inputs or changes in cell content.

The cellular environment 100, also called "world" or "user experience," may be configured in any number of geometrical shapes. As shown in FIG. 1, cells are displayed in a dashboard-like display with a semi-circular arrangement along the bottom of the environment 100, along with a "wall" of cells of various sizes, thereby creating the appearance of a virtual control room. A navigational menu 103 provides interaction for users to modify the view point into the environment. Other geometrical arrangements can be provided for different environments.

Cellular Environment Architecture Overview

Figure 2A:
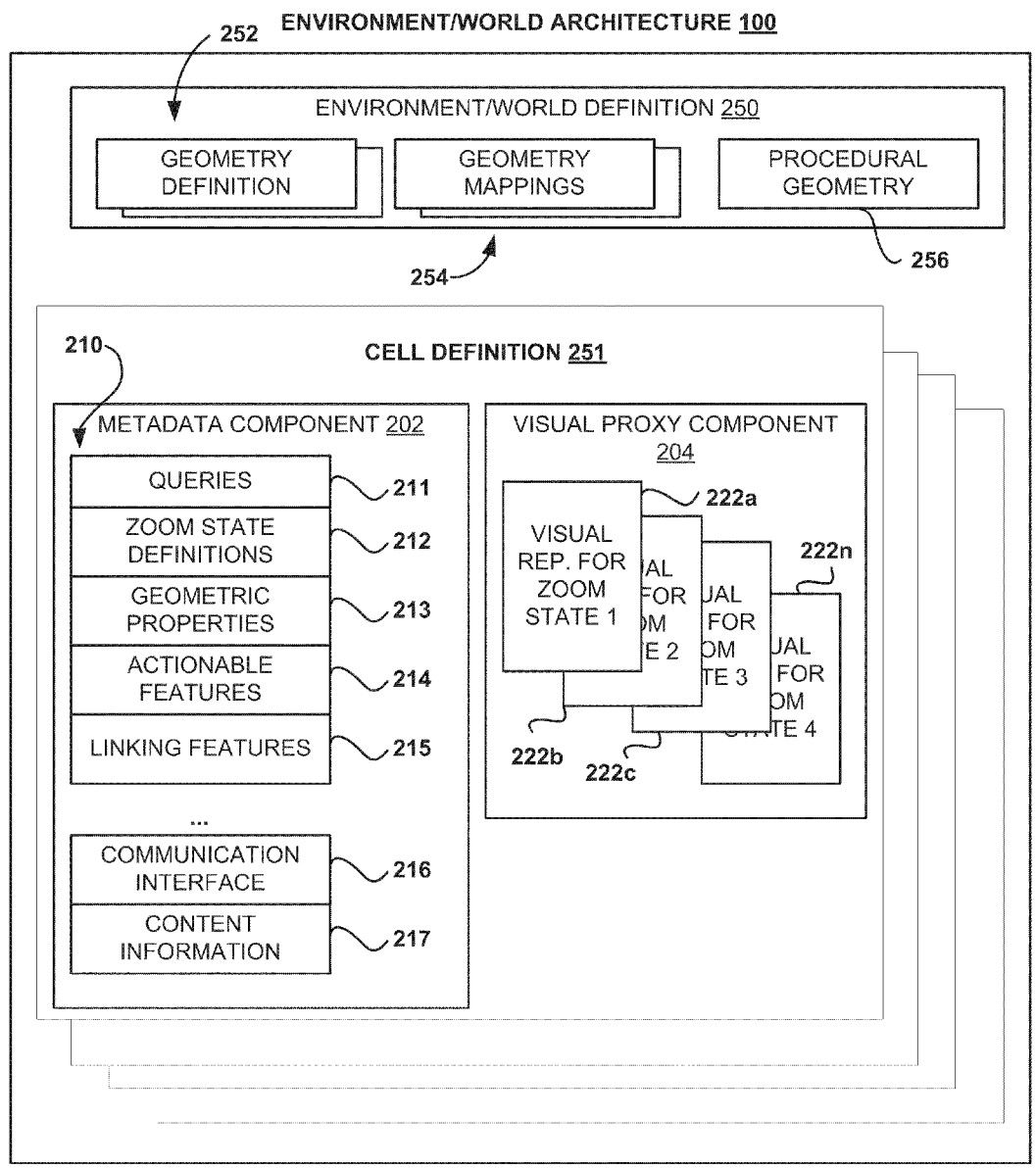
FIG. 2A is a block diagram illustrating a cellularized environment architecture and its associated cell architecture according to one embodiment.

A cellularized environment architecture 100 is shown in FIG. 2A. The cellularized environment 100 includes a cellularized environment definition 250 and cell architecture definition 251 with configuration information for a viewer application 104 to properly display and allow user interaction with the environment 100 and cells 101.

The definitions of the environment 100 may be implemented in multiple forms. For example, the definition for each the components may include sets of keyword value pairs. For example, environment definitions can be expressed as a set of extensible markup language ("XML") tags that may be interpreted by a viewer application 104. The keywords are XML tags with the values enclosed within the tag marks, e.g., <keyword, parameters>[value]</keyword>. As is conventional in markup languages, tags may include associated parameters. One example embodiment using XML to describe the cellular environment is further described below.

1. Environment/World Definition

The cellularized environment definition 250 includes a geometry definition 252 with a set of geometric properties that define the display locations of the cells 101. These geometric properties include information about the display locations in which a cell may be displayed within the environment 100. For example, a cellularized environment definition may include a number of columns, number of cells per column, and the relationship of each cell 101 with respect to the center of the geometry. Accordingly, each cell to be displayed within the cellularized environment 100 may be assigned a relationship to the geometry's origin or center that may be maintained during display.

The geometry definition 252 provides the general mathematical relationships between cell locations to define a geometric configuration or shape. The mathematical relationships are used to maintain the defined shape as the views into the environment change. For example, geometry definitions 252 may define circular shapes, spherical shapes, cubical shapes, flat dashboard shapes, cylindrical shapes, toroidal shapes, or the like. The geometric definitions 252 allow each cell 101 to be associated with a set of vertices of a polygon representing the cell location with respect to the origin of the geometry.

2. Geometry Definitions for Layouts

The cellularized environment definition 250 may also include pre-defined layouts in its geometry definitions 252. In one embodiment, a user input, e.g., hitting the "Enter" key, clicking on "layout" button cell, selecting layout hyperlink, or the like, is interpreted by the viewer application 104 as a request to modify the current layout. In response, the view being displayed is changed to one of a set of pre-determined layouts associated with the cellularized environment. Layouts may be defined in the cellularized environment definition or otherwise programmed in association with a cellularized environment or world. The layouts may specify a view into the world, e.g., a different face of a cube, a section of a sphere, a region of a dashboard, or the like. Layouts may also specify a zoom level for the cells being displayed, cell locations, default values for cells, and the like.

In addition, layouts may include parameters to specify translation, rotation, and scaling of a cell, sets of cells, or world, and environment display motion, e.g., pan, camera view, and the like. In one embodiment, a set of layouts are provided as "quick views" to a cellularized environment in an html viewer. A set of links in a section of the display (e.g., toolbar) describe the "quick views" and upon user selection cause the associated layout (e.g., associated by the layout's "key" parameter) to be implemented and displayed by the viewer application. Further, the ability to dynamically transition between geometries and algorithmically vary the cell display location, shape, size, orientation, and the like with respect to each individual cell or groups of cells alike enables the dynamic generation of motion within the cellularized environment. Moreover, leveraging the metadata component of the cells, further described below, the cell display and motion can be responsive to cell interactions between cells, user actions, and/or content events.

3. Cell Definition

FIG. 2A also shows a block diagram illustrating the architecture of cells 101. Generally, the architecture of a cell 101 includes a metadata component 202 and a visual proxy component 204. The cell architecture provides a common format for visually representing multiple data formats from various sources across the cellularized user interface platform.

With respect to the cell definition 251, the visual proxy component 204 includes one or more visual representations 222 associated with each zoom state for a particular type of information. The visual representations 222 at each zoom state provide simultaneous access to content from various underlying information sources via a uniform user interface. The visual representations 222 are the visually displayed content of the cells in a cellularized user interface. The visual representation 222 at a zoom state may be displayed via one or more cells.

The number of zoom states for any given cell may vary based on the type of information associated with the cell. For example, a particular type of information such as information about current news stories is displayed via one or more visual representations 222a at a single zoom state, while additional visual representations 222b, 222c, . . . , 222n are provided for other types of information such as information about a company's stock. Generally, the visual representations 222 of a cell at its various levels of detail are related to each other based on the information content they represent. For example, the information associated with different visual representations 222 may include a common underlying topic or a common output mode such as video or audio.

The visual representations 222 at various zoom states may be grouped together by a content designer using a Content Development Kit ("CDK"), by a user based on user defined criteria, or by content events algorithmically related to the logical relationships of the information associated with the cell. The visual representations 222 for a given cell 101 may be grouped by providing a cell definition with associations to the various visual representations 222. These visual representations can be expressed, for example, with an XML tag such as <visual\>, with a set of associated parameters. The values for the associated parameters would identify resources or visual representations 222 that can be set by the CDK or dynamically modified based on user or content events.

In addition to the visual proxy component 204, the cell 101 includes a metadata component 202. The metadata component 202 includes a plurality of cell feature definitions 210. In one embodiment, the cell feature definitions 210 can be created or modified dynamically. A sample set of cell feature definitions 210 is shown by way of example in FIG. 2A. Fewer or additional cell feature definitions 210 may be included in the metadata component 604 depending on the cellularized environment design. The metadata component 202 may be generated by a content designer through a CDK. Alternatively, a template of the metadata component 202 may be provided in a cell generation stencil. The stencil includes templates for multiple cells. In generating cells 101, copies of the templates are populated with data from associated data sources as indicated in configuration files. Visual proxy components 204 are similarly generated from templates or otherwise directly from the data as indicated in the configuration and stencil files.

The metadata component 202 includes a query feature definition 211, a zoom state feature definition 212, a geometric properties feature definition 213, an actionable feature definition 214, a linking feature definition 215, a communication interface feature definition 216, and a content information feature definition 217, among other feature definitions 210.

The query feature definition 211 specifies one or more queries associated with the cell 101. Different queries can be provided for different levels of detail representations of the cell 101. The query definitions 211 can be used as a source query for requesting additional information in response to a user action. The query definitions 211 can also be used to establish relationships with other cells 101 or to interact with display features of the cellular environment 100. For example, in one embodiment of a financial data cellularized environment 100, a cell query definition 211 in a first cell 101a may respond to a user selection of the cell 101a by selecting via the query a set of cells 101 (or subcells) with information related a business entity represented by the cell 101a. The selected set of subcells includes a current stock price subcell, a current news subcell, a latest corporate filing subcell, and the like; each of these would take their data from respective data sources and applications.

The zoom state feature definition 212 provides instructions to a viewer application for associating user indications of display proximity with cell behavior. The instructions specify which visual representation 222 in the visual proxy component 204 to display based on the zoom state at which the cell is being displayed. In addition, the instructions may also provide associations between zoom states and cell behavior, such as, functional relationships, hyperlinks, recursive presentations of additional cells (i.e., subcells), worlds, or the like. A viewer application is capable of resolving these instructions to display associated visual representations 222 and to implement the indicated behavior. Further description of these features is included in U.S. Pat. No. 8,418,075, "Spatially Driven Content Presentation in a Cellular Environment," referenced above.

The geometric properties feature definition 213 includes information about the cell's shape, size, display location, and the like. The cell's shape includes information describing characteristics particular to the cell as compared to other cells 101. For example, the cell's shape may vary to adopt the shape of the content it displays. The cell's size includes the cell's relationship to the space allocated for display within the environment geometry. For example, one cell may only occupy half the size of the space allocated for it. The display location of the cell includes its location within the cellularized environment 100. For example, as shown above, an XML description of a cell may include "row" and "col" parameters to specify the cell's location in a dashboard.

The actionable feature definition 214 of the cell includes information about the response the viewer application 104 provides with respect to user actions associated with the cell 101. User actions include activations of cells by the user, for example, clicking on cell. For example, in one embodiment a cell is designated as a layout modifying cell and its actionable feature definition 214 provides a layout change of the cellularized environment upon user activation. This may be accomplished by providing to the viewer the information shown above for a sphere to map a dashboard having the same number of rows and columns. Each cell definition indicates its row and column location and can easily be mapped to the new geometry.

For the actionable feature definition, there is a very wide range of responses the viewer application 104 may provide, including: generating additional cells (i.e., subcells) or additional worlds; modifying environment display properties; generating groups of related cells; activating an underlying application; hyperlinking to a web page or other remote cells; and the like. For example, the actionable feature definition 214 may be indicated in XML as the <activation/> tag, which as shown above may include a "hyperlink" type and a "url" parameter to indicate the URL of an html page to display upon activation.

The cell actionable feature definition 214 may be associated with functionality available from applications from which content is being displayed in the cellularized environment 100. For example, a cell may be associated with multimedia display applications, e.g., a media player, to activate an application control function, e.g., play, upon activation of the cell by a user. In this fashion, a set of cells may be configured to behave as control display elements for an underlying application. Alternatively, a set of cells may be used as browse command buttons for an underlying web browser application, text formatting buttons for a word processing application, or the like.

Through this actionable feature definition 214, the cellular user interface enables the integration of different types of applications and different types of data into a unified user interface. The cellularized display is application agnostic and can provide simultaneously in single user interface outputs from various applications and data sources. The cells 101 display visual information from all these sources acting as an intermediary between the applications generating the output and the corresponding visual representations displayed to a user. This unified display of data from disparate and unrelated data sources enabled by the cellular user interface provides a powerful information management mechanism, as for example shown in the emergency response cellular environment of FIG. 1.

The actionable feature definition 214 can also include instructions associating a user action to the execution of a query. For example, upon user activation of a cell 101$a$ a query is executed over the metadata of the cells 101$b$-101$n$ in the cellular environment 100 and matching cells 101$x$-101$z$ are displayed in response. Accordingly, there is some overlap between the actionable feature definition 214 and the query feature definition 211. The query in the actionable feature definition 214 may include metadata of the activated cell 101$a$ as the basis for the query (or as the query itself). For example, a user activation of a cell 101$a$ generates a layout change of the view into the cellular environment wherein the currently displayed cells 101$b$-101$n$ are reorganized into a group of cells with related content. Groups of cells displayed in close proximity to each other with some relationship between the cells are called "channels." A subset of the cells 101$x$-101$z$ can be arranged into a channel based upon their metadata matching a query term extracted from the metadata of the activated cell 101$a$.

The communication interface feature definition 216 includes information to enable the management of relationships between cells 101 by communicating cell state information in distributed cellularized environments 100. For example, the communication interface feature definition 216 includes a unique cell locator or cell unique identifier ("UID"), similar to a universal resource locator ("URL") for a web page, which uniquely identifies a cell in a network. A communication server may manage a cell's state by propagating any changes made to states of the cell 101, e.g., activation, display location, content edits, and the like, in one instance of the cell 101 to all other instances of the same cell 101 (or to other cells) in the distributed cellularized environment 100. In addition, the communication interface feature definition 216 may also include access right management information to provide different access rights to different users, e.g., content designers, end users, and the like.

The metadata component 202 may also include a content information feature definition 217. The metadata component 202 may simply include the content information feature definition 217 as the sole feature definition 210. The content information feature definition 217 includes information about the content associated with the cell 101, for example, keywords descriptive of the content, keyword-value pairs of information, and the like. The information about a cell's content can be used for organizing the cell display, for querying the cell database, and the like, in order to provide application independent functionality for the display and delivery of content in the cells.

As a general matter, the metadata component 202 and visual proxy component 204 of a cell can be made to depend on external inputs. The values for any of the parameters may be variables capable of changing and/or linked to external inputs. Cells that include these external dependencies are proactive cells. Proactive cells react to user actions and/or content events to update or modify their content. Proactive cells can periodically regenerate their content based on instructions in a cellular framework. For example, one or more cells in an environment 100 are associated with a data feed, e.g., Real Simple Syndication ("RSS") data feed, Atom Syndication Format ("Atom") data feed, or the like. Responsive to changes in the data feed, the cells dynamically regenerate their content and information to provide an updated result. The cell regeneration takes place as indicated in the assembly model or frameworks and may be modified based on user credentials to customize the resulting cellularized environment 100.

Cellular Environment Object Model

Figure 2B:
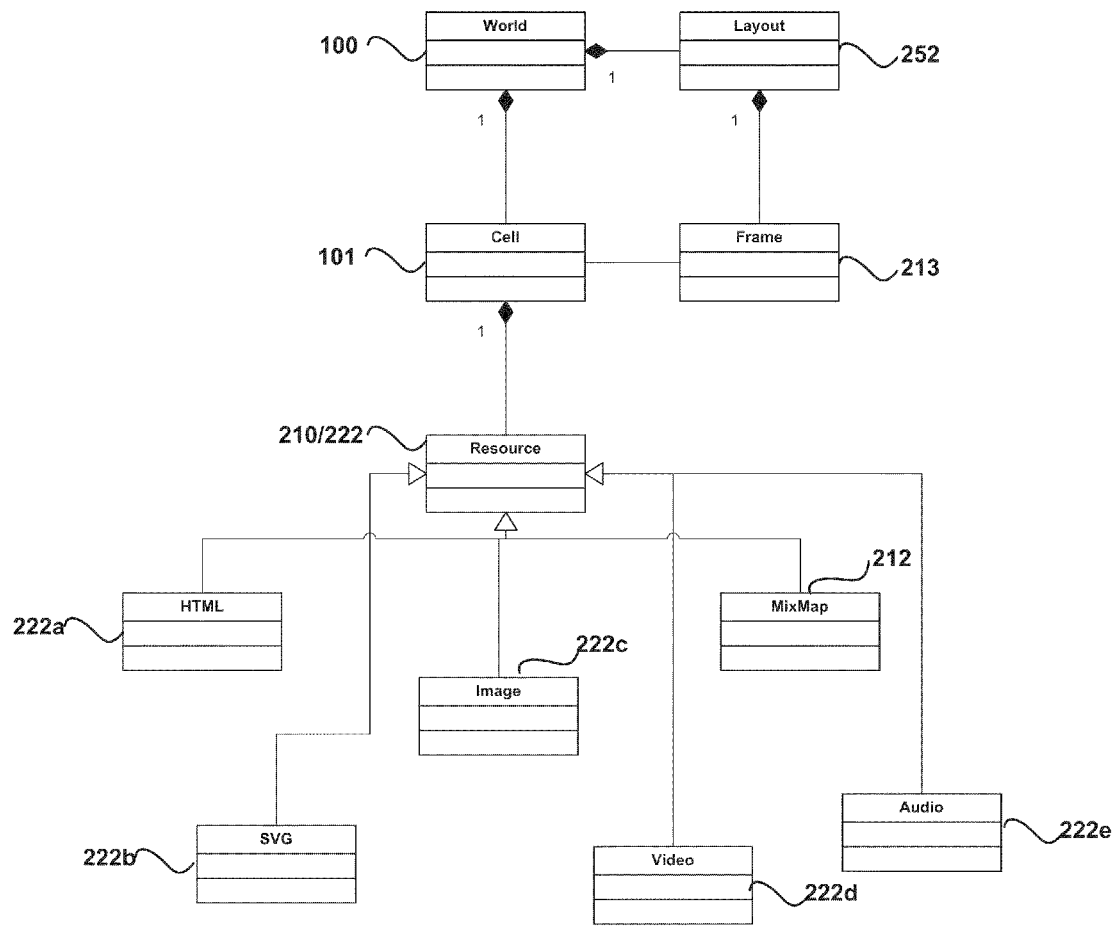
FIG. 2B is an object model diagram of an XML implementation of a cellular environment.

Now referring to FIG. 2B, a high level diagram of a cellular environment object model of an XML implementation is shown. The Object Model ("OM") is an API for XML documents that describe the cellular environments 100 or worlds. The OM shows all objects in the cellular environment (worlds 100, layouts 252, cells 101, frames 213, and resources 210) as structured groups of program objects that can be scripted to. It should be noted that any subset or different set of objects can be similarly defined within the scope of the present invention. The structure and content of the worlds 100 can be expressed in XML, and the interaction model, or behavior, of a world 100 can be expressed in Java, JavaScript, C++, or any other computer language or functional scripting tool.

With respect to the OM shown in FIG. 2B, the World 100 object is the root object of the cellularized environment definition 250. The World 100 object is composed of layout objects 252, frame objects 213, and cells 101. An example of a scriptable property of the World 100 object includes an active Layout 252 selection function, e.g., "activeLayout" function. Examples of methods for this object may include methods for switching active layouts from one layout to another, e.g., "switchLayout" function, and for retrieving cells 101 associated with the World object 100, e.g., "getCellbyID" function.

Layout 252 objects represent the positions of the frames 213 of cells 101 in the world 100, and the geometry environments (e.g. a sphere, a room, or a dashboard) that they are mapped to. Some scriptable properties for layout 252 objects include a layout ID, the world it is associated with, whether it is two-dimensional (e.g., 2D=True), and the geometry of environment 100 the it is associated with. One example of a method for the layout 252 object includes the execution or implementation of the layout, e.g., a "doLayout" function.

In a simplified version of the cellular environment, frame 213 objects can be used to define the position of a cell 101 in the world 100. The frame objects 213 are part of the information descriptive of the cell 101, i.e., geometric properties of the cell 101. Frame 213 objects have position properties but do not represent actual content of the cell 101. As further described below, multiple other objects can be included to describe the properties of a cell 101. The position information of a frame 213 object can be scripted to allow for dynamic variations. Some examples of scriptable properties of frame 213 objects include a frame ID and its associated cell 101 ID. Some examples of methods associated with frame 213 objects include whether its position is locked (e.g., "lock"), whether the can be dragged by a user, (e.g., "canDrag"), whether it can be selected by a user (e.g., "canSelect"), whether a user can zoom into it (e.g., "canZoom"), and actual position changing functions, such as move, resize, and the like.

In this OM, a cell 101 object is a unit of content in the cellular environment 100. Cells 101 are comprised of multiple resources (e.g., feature definitions 210 and/or visual proxy components 222 like for example HTML, images, video, and the like). For example, a single cell 101 can contain multiple images 222 for different zoom state levels. Some scriptable properties of cells include cell IDs, current zoom state level visual proxy component 222, queries 211, and the like. Some methods associated with cell 101 objects include getting particular resources (e.g., "getResource"), setting particular resources for display (e.g., setResource), and the like.

XML Implementation Embodiment

In one embodiment, the cellularized environment architecture may be implemented in XML. One example of an XML implementation includes a world description file with a .viz file extension, "the vizible file." The vizible file includes XML tags for the cellularized environment/world definition 250. These tags provide a set of variables that define properties of the cellularized environment or world 100. In general, there may be two general types of tags, world data tags and cell data tags. World data tags define the environment/world definitions 250, that is, the geometrical definitions 252, the geometry mappings 254, and procedural geometry 256 describing their interaction. The world definition may also include additional world properties, such as present views, channels, additional functionality, and the like. In one embodiment, the vizible XML file (".viz") includes the XML tags for the world 100.

In an XML implementation, the world 100 and cell 101 data may be provided in separate data files or in a single data file. For example, in a single .viz file world and cell tags may be nested as follows:

```
<world>
    [world data]
        <cell>
            [cell data]
        </cell>
        <cell>
            [cell data]
        </cell>
</world>
```

Moreover, multiple sets of definitional sections can be nested within each other, such that one or more "<world> [world data]</world>" definitions or "<cell>[cell data]</cell>" definitions can be included within a "[cell data]" section.

The "[world data]" includes variables and values defining the environment/word definition 250. The environment/ world definition 250, in addition to the geometric related properties 252-256, includes instructions for a viewer to implement world related variables. These include an initial view position and zoom, color scheme, animations, global cell values, layouts, and the like. Layouts are defined as part of the geometry definition 252 of the environment. Implementation of layout definitions is further discussed below.

The "[cell data]" includes variables and values for the viewer to implement cell related display variables, e.g., visual proxy, cell size, and the like. Each cell is associated with "[cell data]" that provides to the viewer values for the variables defining properties of the cell. As further explained below, these variables and their values can be dynamically modified or updated based on user interactions and/or content events.

XML Implementation for World/Environment Definition

The following is an example of tags and associated parameters with data types for a [world data] section in a .viz XML world definition:

```
<world id=[str] init zoom="[defined]" flat_view="[Boolean]" layout="[int]" quickview="[int]"/>
    <colors node_transparency="[Boolean]"><activation= ...> ...</colors>
        <geometry type="[defined]" number_rows="[int]" number_columns="[int]">
        ...
        </geometry>
    <navigation>
        <singleclick show_channels="[Boolean]" show_groups="[Boolean]"/>
        <layouts>
            <layout key="[int]" name="[string]" movement="[defined]" background="[Boolean]" inert="[Boolean]" caps="[Boolean]" frames="[Boolean]" background_shape="[defined]">
                <manipulator />
                <cell id/>
                ...
                <cell id/>
            </layout>
            ...
        </layouts>
    </navigation>
    <zoom activation="[dec]" selection="[dec]" surfing="[dec]" swap_in="[dec]" swap_out="[dec]"/>
</world>
```

In this example, tags are shown with their corresponding value type indicated as [int] for integers, [dec] for decimal numbers, [Boolean] for true/false values, [str] for textual string, and [defined] for a defined value.

The [world data] section is demarked by the <world/> tags. The <world/> tag itself includes various parameters to identify the world and to define the initial display of the world to the client application 104 at start up, e.g., initial zoom state, whether the world is a flat or 3-D geometry, what initial layout to show, and the like.

The section demarked by the <colors/> tags defines activation, selection, background, and highlighting colors to be used as default for all the cells in the world. These values may be modified with local assignments at the cell definition level.

The section demarked by the <geometry/> tags defines general geometry properties such as the type, e.g., spherical, number of rows and columns, default cell sizes, depth, aspect ratios, spacing, background and the like. This is one implementation of a geometry definition 252.

The section demarked by the tags defines the navigation available to the user through the client viewer 104. For example, it defines a response to a single click of a mouse to show a channel or a group. It defines several layouts available to display in response to mouse "movement" as defined by the <layout/> tags. Each layout may include a definition for what cells it includes as shown by the <cell/> tags.

The <zoom/> tag includes various parameters to set responses to zoom state variations, e.g., activation, selection, surfing, swap_in, and swap_out.

For example, in one embodiment XML for [world data] making up an environment definition 250 includes the following:

```
<world init zoom="additional_zoom_1" flat_view="true" index="144" layout="1"
quickview="-1"/>
    <colors node_transparency="true">
        <activation red="255" green="255" blue="255" alpha="255"/>
        <background_color red="255" green="255" blue="255" alpha="255"/>
        <highlight red="255" green="255" blue="0" alpha="255"/>
        <selection red="200" green="5" blue="5" alpha="255"/>
    </colors>
    <animations clump="true"/>
    <geometry type="dashboard" number_rows="42" number_columns="17">
        <cells visible_when_collapsed="0" horizontal_spacing="0.005263"
            generated="true" proportional_rows="0" height="0.040000"
            width="0.140000" vertical_spacing="0.010000"/>
        <background generated="false" depth="-0.040404" height="0.745455"
            radius="0.990000" width="0.987273"
            reverse_outer_background="false"/>
        <caps height="0.262245" generated="false"/>
        <frames generated="true" height="0.002500" width="0.002500"/>
        <inert generated=""/>
    </geometry>
    <navigation>
        <misc_navigation ignore_transparent_pick="false" spin_speed="7"/>
        <mouse drag_panning="true" drag_zoom="true"/>
        <layout .../>
    </navigation>
    <zoom additional_1="7" keyboard_min="0.74" activation="0.121000"
        selection="0.303000" surfing="3.000000" swap_in="0.0" swap_out="1"
        snap_to_levels="false"/>
</world>
```

Layouts

The XML implementation of a world definition 250 may also include pre-defined layouts as part of its geometry definitions 252. For example, a layout for a spherical environment can be specified in XML as follows:

```
<layouts>
    <layout key="21" name="Layout 21" movement="pan"
    background="true" inert="true"
    caps="true" frames="true" background_shape="flat">
        <manipulator qx="0.000000" qy="1.000000" qz="0.000000"
        qw="0.000000"
        tx="446.035919" ty="446.492401" tz="443.167267"/>
        <cell id="10" row="0" col="10" qx="0.000000" qy="0.000000"
        qz="0.000000"
        qw="1.000000" tx="-0.375305" ty="-0.112244" tz="0.025970"
        sx="0.500000"
        sy="0.375000" show="true" morph="6"/>
        <cell id="103" row="6" col="1" qx="0.000000" qy="0.000000"
        qz="0.000000"
        qw="1.000000" tx="-0.496613" ty="0.115356" tz="0.000000"
        sx="0.270000"
        sy="0.054643" show="true" morph="6"/>
</layout>
```

Layouts may include fixed layouts and algorithmic layouts. For example, an XML implementation of a world definition 250 with fixed and algorithmic layouts includes the following tags:

```
<?xml version="1.0"?>
<world id="WorldHello" name="theworld" theme="some theme"
active="Layout1">
    <layouts>
        <fixedLayout id="layout1" is2d="True"
```

-continued

```
        environment="http://env/geometry">
            <frame id="frame1" ref="#cell1">
                <listener event="onlevelofdetailchange"
                handler="changeResource( )"/>
                <position x="434" y="768" width="400"
                height="800"/>
            </frame>
            <frame id="frameN"...
        </fixedLayout>
        <sphere id="layout2" is2d="False"
        environment="http://env/sphere">>
            <frame id="frame1" ref="#cell1"/>
            <frame id="frameN"...
        </sphere>
    </layouts>
    <cell>[cell data] </cell>
    ...
</world>
```

The <fixedLayout\> tag defines a static layout with the position of each frame in the world as given by the "geometry" definition located at http://env/geometry. The first frame at coordinates x=434, y=768, at a camera view or height of 800. This layout is implemented upon detecting a "change of level of detail" or zoom state change. The change in layout is accomplished through the functions "changeResource( )" specified as handler.

By contrast, the <sphere/> tag defines an algorithmic layout that positions frames automatically over a spherical geometry located at http://env/sphere. Each frame is specified by the <frame/> tags and associated parameters.

XML Implementation of Cell Definitions

For illustration purposes, a simplified cell definition 251 is shown below. The XML example shows a cell definition section of a vizible with tags and parameters indicating type of the parameter values. For additional cells in the world or environment, additional similar sections would be used.

```
<cell row="[int]" col="[int]" depth="[int]" id="[int]" type="[defined]"
    locked="[Boolean]" live="[Boolean]" version="[dec]">
    <activation type="[defined]" url="[str]"/>
    <passive>
        <visual filename="[str]" media_id="[defined]"
        alt_filename="[str]"
            alt_media_id="[defined]" aspect_ratio="[dec]"/>
    </passive>
</cell>
```

In this example, the cell metadata component 202 includes a geometric property definition 213 that defines the cell's depth and location in the world's geometry by row and column. The cell's zoom state definitions 212 and associated visual proxies 222 are defined in the <passive> section with two potential zoom states. Each zoom state includes a visual "filename" parameter with a corresponding string ("[str]") value to specify the path and file name for the visual proxies 222. The actionable feature definition 214 is specified by the "activation type" tag and the associated universal resource locator "url" tag. The content information 217 in this embodiment is a simplified version in which a content type is specified with the "type" and "media id" tags and associated defined values of several possible defined values, e.g., movie, image, textual, and the like. In the example XML above, the set of tags used are simply for illustration purposes. Additional or different tags may be used to define any combination of feature definitions 210 for a cell metadata component 202 and associated visual proxy component 204.

An example of a cell definition component with actual values for the various parameters is shown below:

```
<cell row="41" col="10" depth="0" id="0" type=" standard"
    locked="true" live="false"
        version="0">
        <activation type="" url=""/>
        <passive>
            <visual filename="viz.gif" media_id="001"
            alt_filename="" alt_media_id=""/>
        </passive>
</cell>
```

In this example, the cell 101 is part of a "dashboard" type environment and is located at row 41 column 10 of the dashboard environment. The cell type (type=) is "standard" and it is "locked" (locked="true") in its position so that the user cannot alter the cell location during display. As further discussed below, the "live" feature is not active for this cell indicated by the "false" value. Multiple cell versions can be combined within an environment. Therefore a cell version parameter (version=) is provided and it indicates that this cell is version "0." An activation response could also be provided through the <activation/> tag. For this tag there are two parameters, a type of activation (type=) to indicate what occurs when a user activates the cell, e.g., clicks on the cell, and if the activation type was "hyperlink," then another parameter is provided to indicate the URL of an html page to display (url=). For this cell, there is no activation specified. The visual representation for this cell is passive and includes a file "viz.gif" that will be displayed within the cell. A file media_id of 001 indicates that this file is an image. An alternative file name could be provided as a value to the parameter alt_filemname with corresponding media id but in this case no alternative is provided.

The complexity of the cell definition 251 can vary greatly depending on the purpose of the environment and of each cell within the environment. A slightly more complex and content rich cell definition section 251 includes tags and parameters for its various feature definitions in its metadata component 202 and for its visual proxy component 204 it includes tags for identification of resources for its various zoom state level proxy components 222. A sample XML tag set of a cell definition sections is shown below:

```
<cell>
    ...
    <metadata>
        ...
        <content>
            <title> "Spiderman 2"</title>
            <type media=movie> "action" "fantasy" "sci-fi" </type>
            <names nameof=actors> "Tobey Maguire" "Kirsten Dunst"
                "James Franco" "Alfred Molina"</names>
            <outline> "Peter Parker has personal problems to deal with
                while Spider-Man confronts Dr. Otto Octavius, who
                has been transformed into Doctor Octopus, a multi-
                tentacled villain" </outline>
            <query1> "movie" </query1>
            <query2> "entertainment"</query2>
        </content>
    </metadata>
</cell>
```

As shown above, the content information feature definition 217 of a cell 101 may include information upon which queries can be performed, e.g., title, media type, names of relevant persons (e.g., actors, authors, directors, employees, employers, corporate officers, and the like), outline of the content represented by the cell, and the like. In addition, query specific fields, e.g., <query1>, can provide a reference for fast query execution based on predefined parameters, e.g., media type, content type, or the like. For example, a channel organization function may execute a query over a query specific field, e.g., <query 1>, to organize cells based on the type of information they display using this feature of the cell metadata component 202.

Similarly, additional purpose specific keywords or tags may be included to enable content display enhancement and features, such as, dynamic filtering (e.g., query based filtering and presentation), contextual presentation (e.g., provide media player menus when displaying a cell type "movie" or "audio file"), 360-degree views of particular content of interest to the user (e.g., presenting related more in depth content upon user interest indication), and the like. Thus, the metadata content information feature definition 217 advantageously enables intelligent content presentation to users.

The complexity of the visual proxy component 204 is also variable. The following example illustrates the visual proxy component 204 and zoom state definitions 212 for an example cell architecture with three zoom states:

```
<cell id="cell1" name="imagecell">
    <data name="name">value</data>
    <data name="name">value</data>
    <resources>
        <image id="image1" uri="image1.jpg" type="Texture"/>
        <image id="image2" uri="image2.jpg" type="Texture"/>
        <image id="image2" uri="image2.jpg" type="Texture"/>
    </resources>
    <mixmap id="imagemixmap2">
        <levelimage level="512" src="image1"/>
        <levelimage level="256" src="image2"/>
        <levelimage level="128" src="image3"/>
    </mixmap>
</cell>
```

In this example, the <resources/> tags demark the section defining the visual proxy component 204. Each <image> tag denotes a visual representation 222. The <image> tag includes an image id to identify the visual representation 222, a locator or uniform resource identifier ("uri") to specify a file and path name if necessary, and the type of visual representation. The <mixmap/> tags demark the zoom state definitions 212 section. For each zoom state, a <levelimage/> tag provides a resolution of the cell at the zoom state (e.g. level="128" indicates a resolution of 128×128 pixels) and a content reference for the zoom state. For example, the content reference at zoom state 1 for the cell is src="image1", which specifies that the image id "image1" is the visual representation 222a at zoom state 1. Similarly, the content reference at zoom state 2 for the cell is src="image2", which specifies that image id "image2" is the visual representation 222b at zoom state 2.

Procedural Geometry

The relationships between cell locations in the geometric configuration and the display properties of each cell 101 are algorithmically related based on the mathematical model associated with the geometry of the configuration. These algorithmic relationships enable dynamic display modifications and motion of the cells 101. In any given display geometry configuration, the display and motion of every cell can be algorithmically or procedurally defined as a "procedural geometry" 256. A procedural geometry 256 includes instructions to modify cell display locations according to the geometry definitions 252 and the corresponding geometry configuration mappings 254 in the environment definition 250. The procedural geometry 256 is based on the associated mathematical models of the geometric configurations specified for the environment. Display parameters in the procedural geometry definition 256 enable the dynamic modification of the display based on real-time input from outside sources, e.g., user actions, content events, and the like.

For example, in one embodiment, a spherical environment 100 includes several parameters that are provided as input to a viewer in order to algorithmically generate the sphere and its motion. Some of the parameters specify information applicable to all cells. The generalized sphere geometry parameters may include the following:
"numRows" (the number of rows of cells)
"numCols" (the number of columns of cells)
"aspWH" (the aspect ratio of the cell (width/height))
"capHeight" (the cap height)
"outerSphereR" (the outer sphere radius)
"innerSphereR" (the inner sphere radius)
"proporRowNum" (the number of rows of cells whose size are proportional)
"cellSizeRatio" (the parameter for modifying the cell size)
"frameWidthRatio" (the parameter for controlling frame border width)
According to the above parameters the sphere is algorithmically generated on the viewer. The sphere includes outer and inner cells, caps on its top and bottom, frames and a frame box between the outer and inner spheres. Some rows of cells whose size are proportional are generated according to parameter "proporRowNum." The size of cells on the other rows is constant and the same for all cells. The cell size can be modified by changing values for the parameter "cellSizeRatio." Using different values for "frameWidthRatio," the frame border width can also be controlled.

Figure 3A:
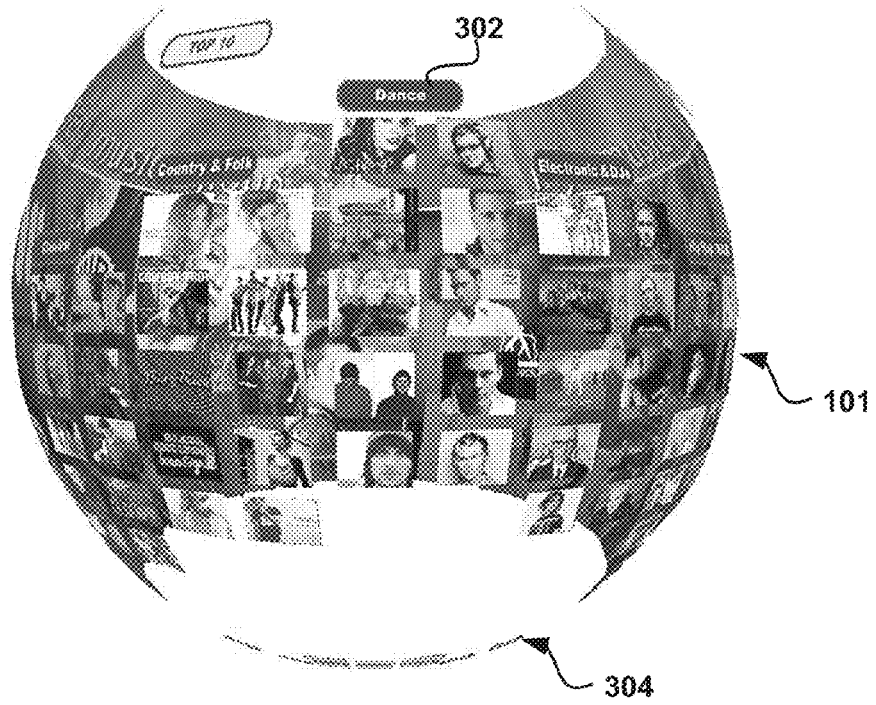
FIG. 3A shows a sample cellular user interface illustrating a spherical cellularized environment in a user selection or browse mode.

For example, with reference to FIG. 3A, the geometry definition 252 of a spherical cellularized environment 300 provides geometric descriptions of its surface cells based on their aspect ratio and size. The shape and location of every cell 101 is controlled through as a set of input variables and mathematical equations that operate on them. By procedurally changing values used in the algorithm, the cells 101 can be rearranged or moved while maintaining their general relationship to each other and therefore maintaining the environment's geometrical shape.

Figure 3B:
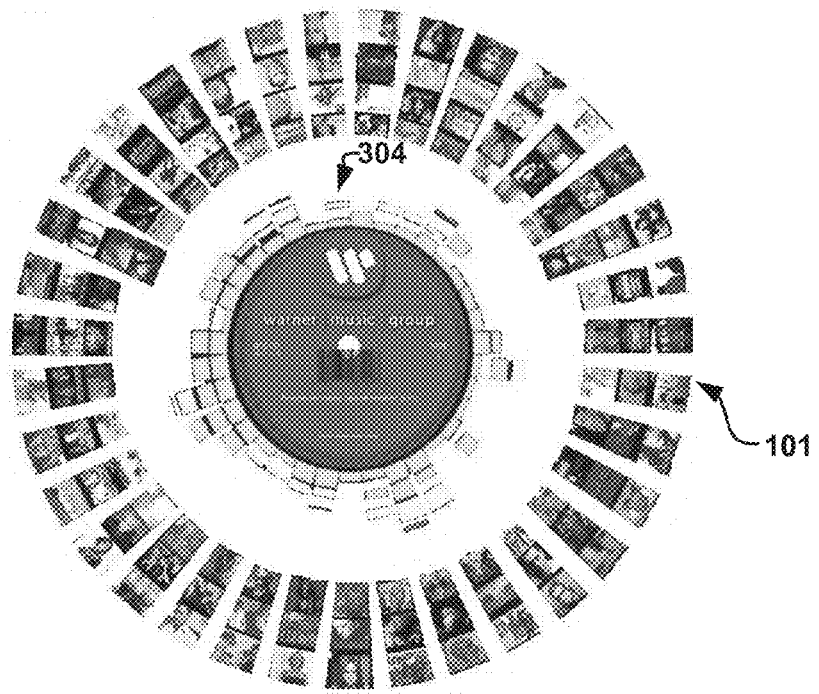
FIG. 3B shows a sample cellular user interface illustrating a CD-shaped cellularized environment.

In addition, a single cellularized environment 100 may include multiple geometry definitions 252 and geometry relationships or mappings 254 between the multiple geometry definitions 252. The geometry relationships 254 between the geometry definitions 252 provide a mapping of cell locations between one geometric configuration and another. The geometry relationships 254 enable the dynamic transition of the environment display from one geometric configuration to another. For example, FIG. 3B shows the cellular environment 300 of FIG. 3A dynamically transformed from a spherical shape to a circular shape (simulating the shape of a compact disc). The cellularized environment definition includes a mapping of the cell locations from a row and column around the surface of the spherical geometry to a radial position on the radial rows and columns on the disc's geometry. The transition between the two geometries may be associated with a predetermined event, such as a user action or a content event. For example, a user may provide a selection of geometry and the corresponding geometric configuration is applied to the existing cells. Alternatively, a content designer may program transitions from one geometric configuration to another, for example as part of a "slide show" or other dynamic presentation of the cellularized environment.

Figure 3C:
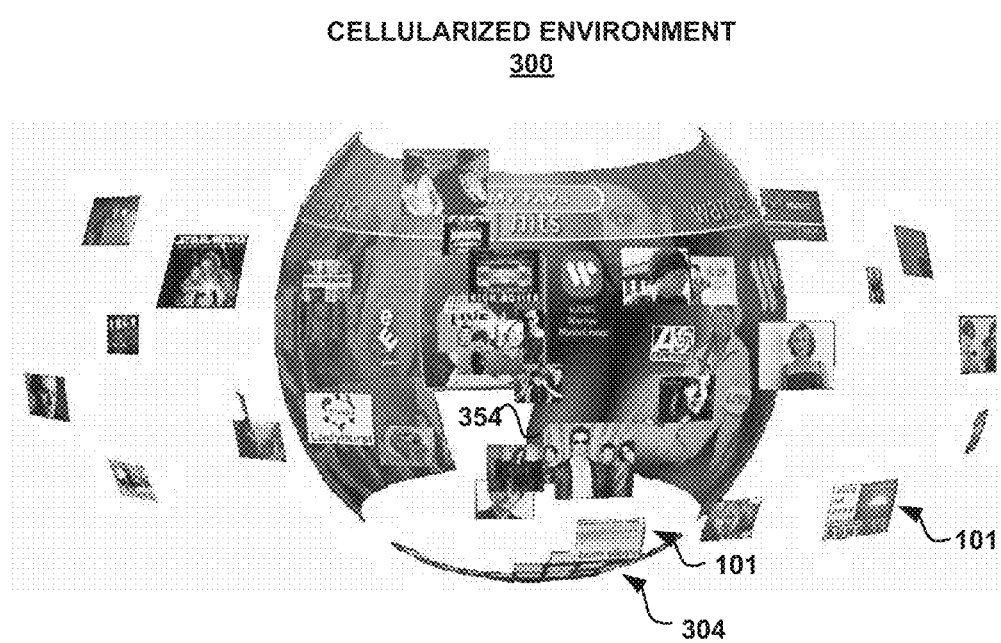
FIG. 3C shows a sample cellular user interface illustrating a spherical cellularized environment in a shuffle mode.

External events, such as user actions, content events, or the like, may be linked to the procedural geometry 256 of an environment definition 250. The external events can be used as triggering signals to dynamically generate changes in the cellularized environment geometric configurations. For example, FIGS. 3A and 3C show a cellularized environment for multi-media-based content in different display modes. FIG. 3A shows the cellular environment 300 in a user selection or browse mode. Cells 101 in this embodiment are arranged into a spherical geometry, with channels of music albums of related genre as indicated by the genre label cells 302, e.g., "Dance."

FIG. 3C shows the cellularized environment 300 in a "shuffle" mode, i.e., while playing music, in screen saver mode, or the like. In this mode, the cell 101 locations are algorithmically associated with the data content of a selected cell 754, for example, an audio data-file such as an .mp3, .wav, or the like. A "shuffle" algorithm derives from the audio data file audio signal amplitude levels for a set of frequencies according to conventional audio equalizer techniques. The shuffle algorithm includes a mapping from the audio amplitude/frequency information to the display locations and other properties of the cells in the cellularized environment. Based on these algorithmic mappings 254, the cellularized environment dynamically "shuffles" geometries or cell locations based on the amplitude/frequency values ("content events") derived from the audio data-file. Optionally, the amplitude/frequency equalizer information can also be used to drive a visual equalizer 304 made up of bars representing frequency bars, with cells of different colors representing amplitude levels. Although described with respect to audio data-files, in alternative embodiments the content events mapped to cell locations can be based on user preferences or external inputs from other dynamic data sources, e.g., RSS feeds, a webcasts, or the like.

At the cell level, any deviation from the generalized parameters of the procedural geometry may be specified in the cell's geometric properties feature definition 213. The geometric properties feature definition 213 enables procedural geometry operations to vary the cell locations dynamically, e.g., in a choreographed pre-defined manner, in response to user queries, in response to user commands, in response to the contents of other cells or the environment itself. The information in the geometric properties feature definition 213 provides each cell 101 with information of its display location within the cellularized environment 100 and with respect to other cells 101. This data is used by the viewer application 104 to display the cells. For example, a location vector with respect to an origin in the cellularized environment is maintained in the geometric feature definition 213 for the cell. As the cell is moved, e.g., by user command, animated "slide show" presentation, or the like, the vector components are changed to track and indicate the proper display location of each cell.

Channels

The geometric configurations can be enhanced by establishing relationships between groups of cells 101 into what is called "channels." A channel of related cells 101 can be provided to cluster cells 101 based on their relationship. Cells 101 may be grouped into a channel based on the content they are associated with, based on user preferences, based on content events, based on designed relationships, based on queries, based on commercial agreements to associate content, or based on any other relationship established between groups of cells 101. Each cell 101 includes a channel membership feature definition assigning the cell to a particular channel (if any), for example, based on content, e.g., all financial information cells are assigned to the financial channel, all entertainment information cells are assigned to the entertainment channel, and the like. Channels in the cellularized environment 100 are used to display the related cells in close proximity to each other. Thus, if for example, a user selects to sort the cells in the cellularized environment by channel, the cells are physically clustered together in the display based on their channel assignment information. Other association techniques include media type, source, or the like.

Channel associations can be dynamically generated based on queries. A user may generate custom channels in the cellularized environment 100 by providing query definitions for each channel. The channel queries are executed over the cell metadata and matching cells are assigned to the channels based on the query. The queries may be explicitly input by the user, inferred from user actions, provided as part of cell interactions, derived from content events, through interaction with other system elements, or the like.

Figure 4:
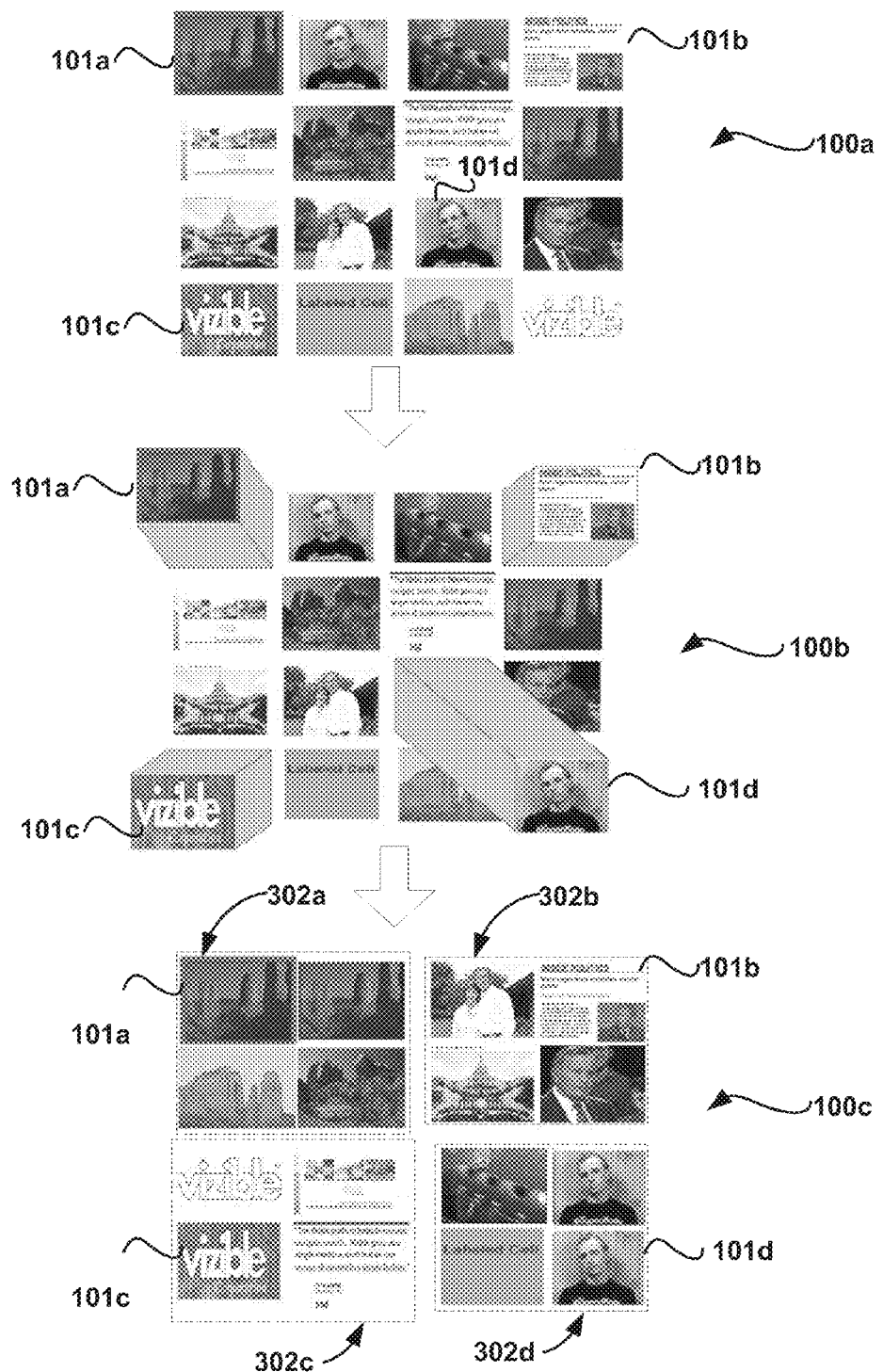
FIG. 4 shows three illustrations of a dashboard cellular environment 100a in three states illustrating an inference query from user actions.

For example, referring to FIG. 4, a dashboard cellular environment 100a is shown. The cellular environment 100 includes 16 cells 101a-101p. The user places cells 101a, which includes a "landscape" content descriptor, 101b, which includes a "presidential" content descriptor, 101c, which includes a "Vizible" content descriptor, and 101d, which includes an "artist" content descriptor, each in a corner of the four quadrants of the dashboard 100b (illustrated as the raised cells in the corner of then environment 100b). The user then requests to the viewer application 104 to organize the remaining cells 101e-101p into four quadrants of the display, each quadrant associated with a channel matching one of the four corner cells 101a-101d. The viewer application 104 may include a clustering algorithm based on any conventional clustering technique. For example, using the cells' content descriptor metadata values (e.g., landscapes, presidential, Vizible, artist, label, movie) as dimensions and their presence or absence in the cell's metadata as their values (e.g., 0 or 1), clustering techniques such as Singular Value Decomposition ("SVD") or Principal Component Analysis ("PCA") can be used to group cells with a number of "content dimensions" in common into clusters. Any other metadata elements could be used as dimensions, for example, display media type, data source, or the like. Using such an algorithm, the remaining cells 101e-101t are clustered into four channels 302a-302d based on the cells' content descriptors. The viewer application then physically re-arranges the cellularized dashboard 100c display into four quadrants of cells closer together representing the four channels: 302a with landscape content, 302b with presidential content, 302c with Vizible content, and 302d with artist and other content not matching the other three channels.

Additional channel formation is accomplished using a server in the system, e.g., integration server 510, to manage the interaction between cell content in a cellularized environment and live content in external data, e.g., World Wide Web data, RSS data feeds, Atom data feeds, or the like. The integration server 510, using conventional filtering algorithms, associates content in a cell 101a selected by a user with a group of corresponding channel cells 101b, . . . , 101n. The corresponding cells 101b-n are dynamically generated upon the user's selection of the cell 101a based on external data. The content for the channel cells 101b-n is derived from data sources through filtering algorithms. A channel with the combination of the user selected cell 101a and the system generated channel cells 101b-n is displayed.

Figure 5A:
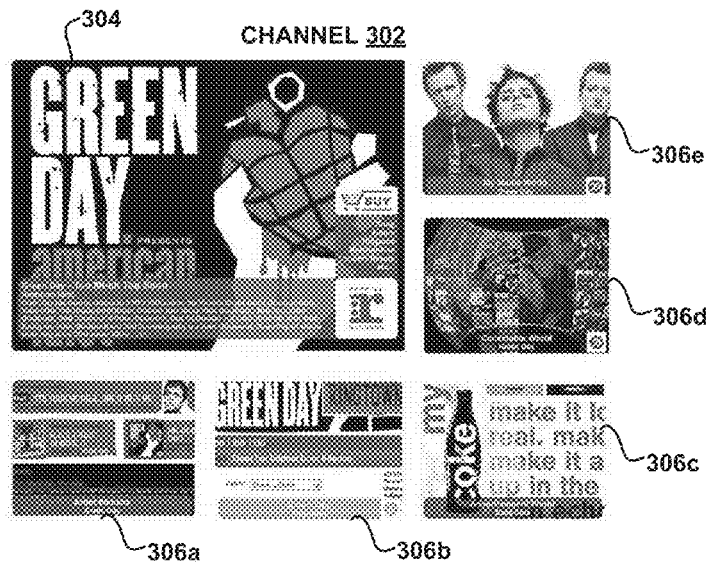
FIG. 5A shows an illustration of a channel in a cellularized environment.

This dynamic channel generation feature enables the combination of user selected data with the delivery of added value content from third parties in a seamless transaction. For example, FIG. 5A shows an illustration of a channel in a cellularized environment 300. The cellularized environment 300 is customized for the display of music related content. In this embodiment, a dynamic channel 302 is generated based on a previous user selection of a cell with a particular music album, artist, or the like, for example, by clicking on a cell of the environment shown in FIG. 3A. In response to the user selection, the cell's zoom state is changed and displayed as cell 304. Additional cells 306 are presented in the channel 302. Associated with the channel 302, one cell 706a provides additional information about the music selection, e.g., album or artist information, news associated with the album or artist, or the like. Another cell 706b in the channel provides access to an e-commerce web page, e.g., for purchasing the selection, merchandising associated with the selection, or the like. An additional cell 706c is provided with advertising associated with the selection.

The association between cells in the channel may be based on the cell's content. For example, the advertising cell 306c may contain images of other albums by the same artist, advertising with words in common with the selected cell, or other similar content derived for example from a content based search of the data feed. Alternatively, the content of the advertising cell 306c may be associated with the selected cell based on forced associations. For example, advertising may be provided in association with a particular content, e.g., artist, album, song or the like, such that when that content is selected by a user the advertising is displayed. This association can be provided through proactive cells. For example, the visual proxy definition of the advertising cell 306c may include dependencies on input from the metadata of the selected cell and input from en external source that provides a mapping between advertisements and the selected cell metadata. Using such a mechanism, an advertiser may choose to associate a particular product with a highly popular artist. The forced association may be dynamically changed to vary the advertisements displayed, e.g., based on an RSS feed providing different advertisements mapped to different artists changing over time. Additional channel cells 306d . . . 706n may be provided with additional channel related content.

This sample embodiment is not limited to music-based content. For example, a news-based cellularized user interface may also be provided according to these features and functions. In this embodiment, a cell enables a user to subscribe to a news feed, e.g., RSS feed or the like. The cell dynamically renders visual proxies associated with the content of the feed appropriate for each available zoom state. As the content in the feed changes, the visual proxies for the cell are updated. In addition, upon user selection of the cell, e.g., click, double click, or the like, the cell is displayed at a magnified zoom state as cell 304. In addition, associated channel cells 506 are concurrently generated and displayed as a channel 302.

The channel cells may include a cell 306a displaying results from an online search engine to a query made up of relevant keywords of the feed at the time the user made the selection. Another cell 306b may display a product available for purchase associated with the content of the selected cell 304, e.g., a book, magazine, electronic article, or the like, associated with the topic of the feed. An advertising cell 706d may display advertisements associated with the cell, either related in content, through a forced relationship, or otherwise. For example, an advertiser may request to have his advertisements displayed in association with a highly publicized news event.

Additional channel cells 306 with different associations to the selected cell 304 may also be displayed in the channel 302. In addition, in one embodiment, the content displayed in the cells while in this channel 302 display mode or view varies according to changes in the news data feed, i.e., as the main news story changes in the feed, the selected cell 304 dynamically changes its content and all the associated channel cells 306 are updated accordingly.

Dynamic Generation of World Objects Based on Templates

Referring back to FIG. 2, the cellularized environment architecture 100 may include templates in its environment definitions 250. These templates are used for dynamically generating various aspects of the environment, even up to entire environments themselves. These template environment definitions 250 are called assembly models or framework. The assembly models and frameworks include instructions for the subsequent generation of the actual cellularized environment 300. Frameworks provide content specific assembly models for particular applications of cellularized user interfaces, e.g., Emergency Operations Center ("EOC") frameworks (such as for the generation of the environment of FIG. 1), multimedia data frameworks, and the like. Assembly models are generalized for any type of content. In the following description the term "assembly model" is used to refer to both assembly models and frameworks.

The assembly models may include a set of defined variables for input to a geometry definition 252 template to enable the dynamic generation of the cellularized environments 300. A template geometry definition 252 specifies the mathematical relationships to be established between the variables conditioned on the different potential values those variables may take on. Once the variables receive those values, the mathematical relationships between the actual values are established for the generation of the environment geometry. Upon generation of an instance of the assembly model, a number of columns, number of cells per column, number of rows, overall size, and the like is specified as input to the template by a content designer, user, a system API, a data feed, or the like.

Alternatively, the values for the template's input variables may be dynamically computed to dynamically generate a cellularized environment 300 based on the assembly model in response to an external input, such as, user inputs, content events, or the like. For example, a query generated cellularized environment executes a query that results in a number of cells matching the query. Based on the number of query matching cells, values for number of rows, columns, and cells per column are calculated and input into a geometry template of an assembly model that may be populated to generate an environment displaying the resulting cells.

Figure 5B:
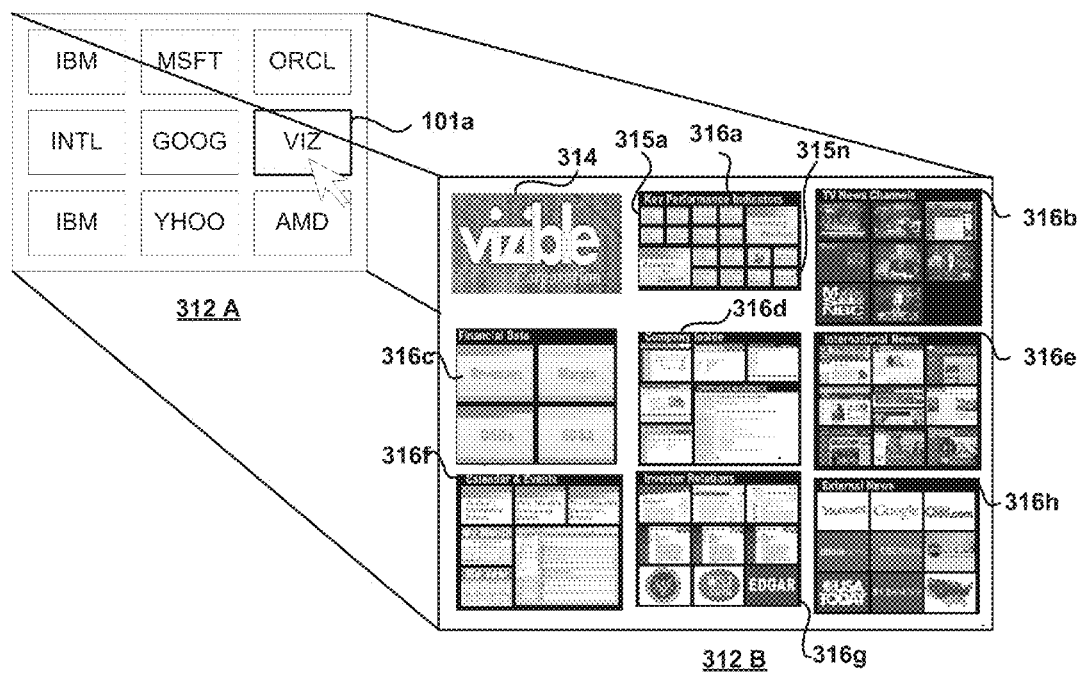
FIG. 5B shows two illustrations of a dashboard cellular environment transitioning from a first state to a second state illustrating dynamic channel generation from external events.

Other cell arrangements, i.e., environments, worlds, templates, and the like, can be dynamically generated based on content events or user actions. For example, FIG. 5B shows a sample company information dashboard cellular environment 312. Environment 312A represents a first state of the cellular environment 312 when its cells 101 are displaying stock symbols that dynamically change as stock data from a data feed is received. In response to a user's selection of a cell 101a while a stock symbol of a company of interest (e.g., VIZ) is displayed, a company information dashboard cellular environment 312B is dynamically generated with information about the company of interest.

The dashboard 312B includes a representation of the selected cell 314 at a new zoom state and a several channels 316 associated with the selected cell 314. For example, the dashboard 312 includes a "Key Performance Indicators" channel 316a, a "TV News" channel 316b, a "Financial Data" channel 316c, a "Company Inside" channel 316d, an "International News" channel 316e, a "Calendar & Events" channel 316f, an "Investor Relations" channel 316g, and an "External News" channel 316h. The channels are dynamically configured based on proactive cells whose content is made dependent on queries using the stock symbol being displayed in the selected cell. Within each channel a set of channel cells 315 include additional content associated with the selected cell 314 and related with other cells 315 in the channel 316. Thus, a cellularized environment 312 is nested within a cell and is dynamically generated upon user selection of the cell in another environment. The content of the proactive cells 315 in the dynamically generated environment 312 is derived from the selected cell by association, either directly through content queries, i.e., keywords, topics, or other content similarities, forced associations, i.e., established relationships between different content, or otherwise associated as inputs to cell definitions in their metadata components.

Dynamic channel generation through queries can be implemented in an XML embodiment in a variety of ways. For example, in one embodiment a dynamic channel definition is provided by the following:

```
<channel>
    <VizibleQuery layout="Ticker_Channel.viz">
        <Query row="1" operator="and">
            <expression operator="or">
                <filter propertyName="app" operator="="
                    propertyValue="corpgov"/>
            </expression>
            <expression operator="or">
                <filter propertyName="ticker" operator="="
                    propertyValue="$ticker"/>
```

```
        </expression>
      </Query>
    </VizibleQuery>
</channel>
```

In this example, a channel definition is demarked by the <channel> tags. The channel includes a query set demarked by the <VizibleQuery> tags. Although in this example a single query is shown, any number of queries may be used within a query set. The queries in the XML are demarked by the <Query> tags. Within a query, multiple expressions (demarked by <expression> tags) are included with an "operator" parameter and a filter. The operator parameter, is a logic operator, i.e., AND, OR, and the filters (demarked by <filter> tags) are a set of conditions combined through logic or arithmetic operators that the cells in the channel must meet. The filter tags specify parameters in the cell definition in the "propertyName" variable and their value in "propertyValue". Note that both of these specifications in the filter tags may be linked or made dependent on an external source by making the value a global or external variable. For example, in the XML below, the "propertyValue" for the second <expression> is set to the variable "$ticker" which may be a changing value given by a feed, e.g., ticker feed, RSS feed, or the like. Thus, depending on when the channel is dynamically formed, the value of the $ticker may be different.

These query algorithms are used to determine related groups of cells ("CellGroups"). CellGroups are created by sorting or grouping based on an algorithm that first sort all the cells based on their metadata, then creates a hierarchy of groups. These groups are passed on to a layout algorithm, which would arrange the cells in a same group together into a channel.

System Architecture

There are multiple possible configurations of system architectures for a system to provide cellular user interfaces as described herein. For illustrative purposes four different sample configurations are described and should not be understood as limiting the scope of the invention as recited in the accompanying claims.

1. Client Configuration

Figure 6A:
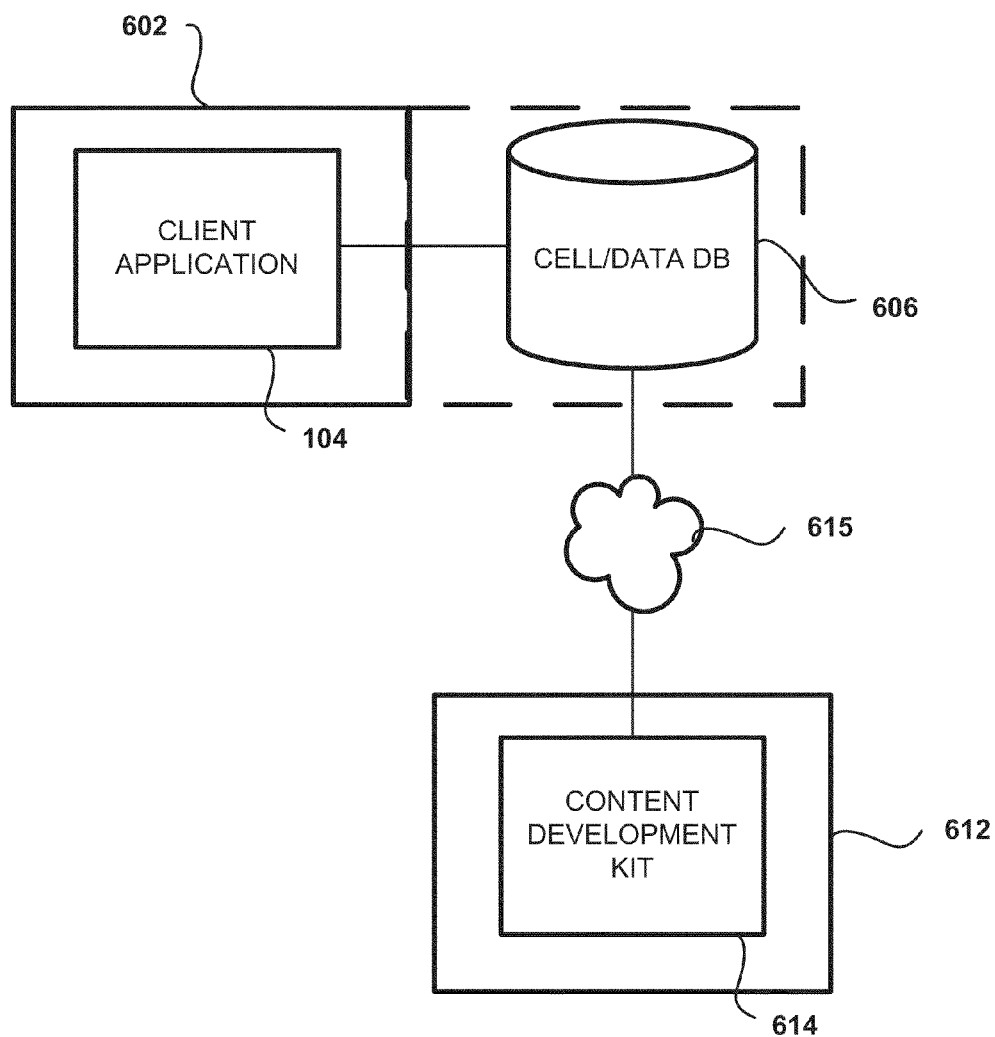
FIG. 6A is a block diagram illustrating a sample client configuration according to one embodiment.

FIG. 6A, is a block diagram illustrating a sample client configuration according to one embodiment. The client configuration 600 is a system architecture for providing a cellular user interface. A client application 104 and a cell configuration database 606 operate on a client computing environment 602. For example, a client computer system 602 may include one or more processors and local RAM to execute computer instructions from a computer readable media. The client computing environment 602 includes any computing hardware with ability to display graphics, e.g., personal computers, personal digital assistants ("PDAs"), mobile or cellular telephone devices, tablet computers, and the like. The program instructions, locally or remotely stored and executed, are configured to implement the client viewer application 104. In one embodiment, the client viewer application 104 includes a custom application or a thin client application operating within another software environment, e.g., a browser based client, JAVA client, or the like.

The client computing environment 602 may include a local storage device 606 to store the cell 101 and user data database for a cellular user interface 100. Alternatively, the storage device 606 may be external to the client computing environment 602, e.g., an external hard drive, a flash memory device, a network storage device, or the like. The client computing environment 602 is connected to the storage device 106 through a peripheral interface connection (e.g. USB), network connection, or the like.

The storage device 606 includes databases for storing configuration data making up cellularized environments. In addition, the storage device 606 may include configuration data for the dynamic generation of additional environments, such as cellular frameworks, assembly models, worlds, or the like. The configuration data is provided as a result of a design by a content architect. In addition, storage device 606 includes databases for storing user credentials, for example, user preferences inferred from user interactions with the system. The storage device 606 may also be accessible from a content architect machine 612 operated by a content architect. A CDK module 614 is implemented in the content architect machine 612 to compose the cellularized environments for the user.

Figure 6B:
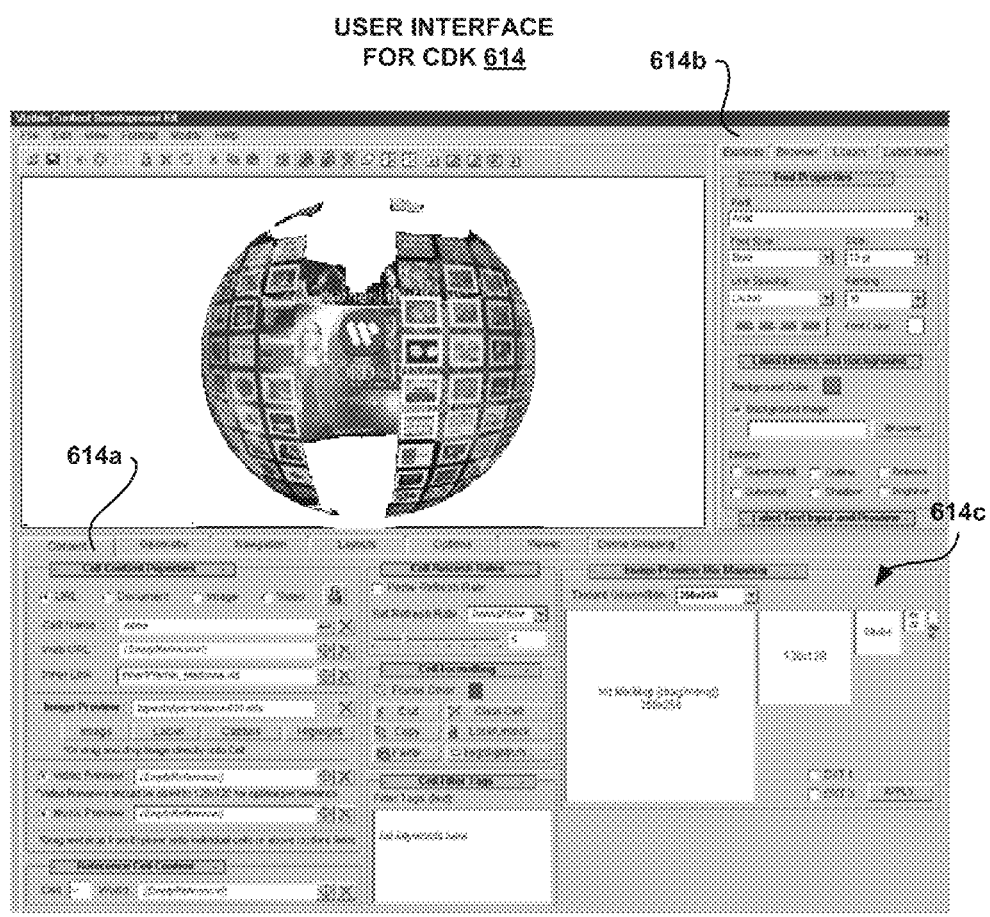
FIG. 6B is a sample user interface for a content development kit module according to one embodiment.

The CDK module 614 establishes relationships between the cell-based data objects and user data, both of which may be stored in the cell/data database in the storage device 606. The CDK module 614 is included in an independent content architect system 612. However, the CDK module 614 may be included in the client computing environment 602. FIG. 6B shows a sample user interface for a CDK module 614. It should be noted that other content development interfaces may be used in addition to or instead of the CDK module 614. For example, a set of system application programming interfaces ("APIs") enable content sources to generate cell content and structure or architect cellular environments in place of a content architect.

The content architect can deliver or otherwise make available a cellularized environment 100 (e.g., a dashboard, world, experience, or the like) to the end users. Alternatively, the content architect can provide instructions for dynamic cellular environment generation in the form of assembly models, stencils, configuration files, or the like. The cellularized environment or the instructions for its generation are stored in the storage device 606 and made available to the users. Then the users can access the cellularized environment 100 from the storage device 606 using the client viewer application 104. For example, in one embodiment, a cellularized environment is stored in a local hard drive 606 as an XML world definition file (e.g., .viz file) that is loaded to the client machine 602 through the viewer application 104. The viewer application 104 includes instructions to read cellularized environment configuration information from the world definition file and to render visual content of the cells to the graphics hardware of the client machine 602 for display. The image rendering components of the viewer application 104 may be implemented based on standard cross-platform rendering libraries, as for example used in computer gaming applications. The visual representations 222 of each of the cells are when the cells are generated in the cellular UI system. The image generation is offloaded from the user's processor; the user's processor executing the viewer application 104 does not generate the visual representations 222 of the cells, it only needs to display them on the user's display device. This enables the user's system to display of many more graphics-rich visual representations 222, such of for example video feeds, than if the processor was also tasked with generating the graphics themselves.

The viewer application 104 also includes instructions to dynamically generate cellularized environments 100 triggered by user action or content events. The dynamic generation is based on templates and instructions provided as a set of frameworks or an assembly model. In addition, customization of the environment 100 is possible through data stored in user credentials for a resulting user-customized cellularized environment 100. For example, responsive to a user query for a particular type of data, the viewer application 104 generates a world based on an assembly model dictating underlying geometries and cell relationships to display the resulting output in a cellularized user interface 100. Alternatively, a content architect may provide a cellularized environment 100 made up of proactive cells. As described above, proactive cells are cells 101 that react to user actions or content events to update or modify their content.

The client configuration of the system has several advantages. For example, it is simple to use for rapid prototyping and creation of demonstration worlds and user experiences and it is simple to install and maintain without requiring administrative overhead associated with using external data sources.

2. Relay Server Configuration

Figure 7:
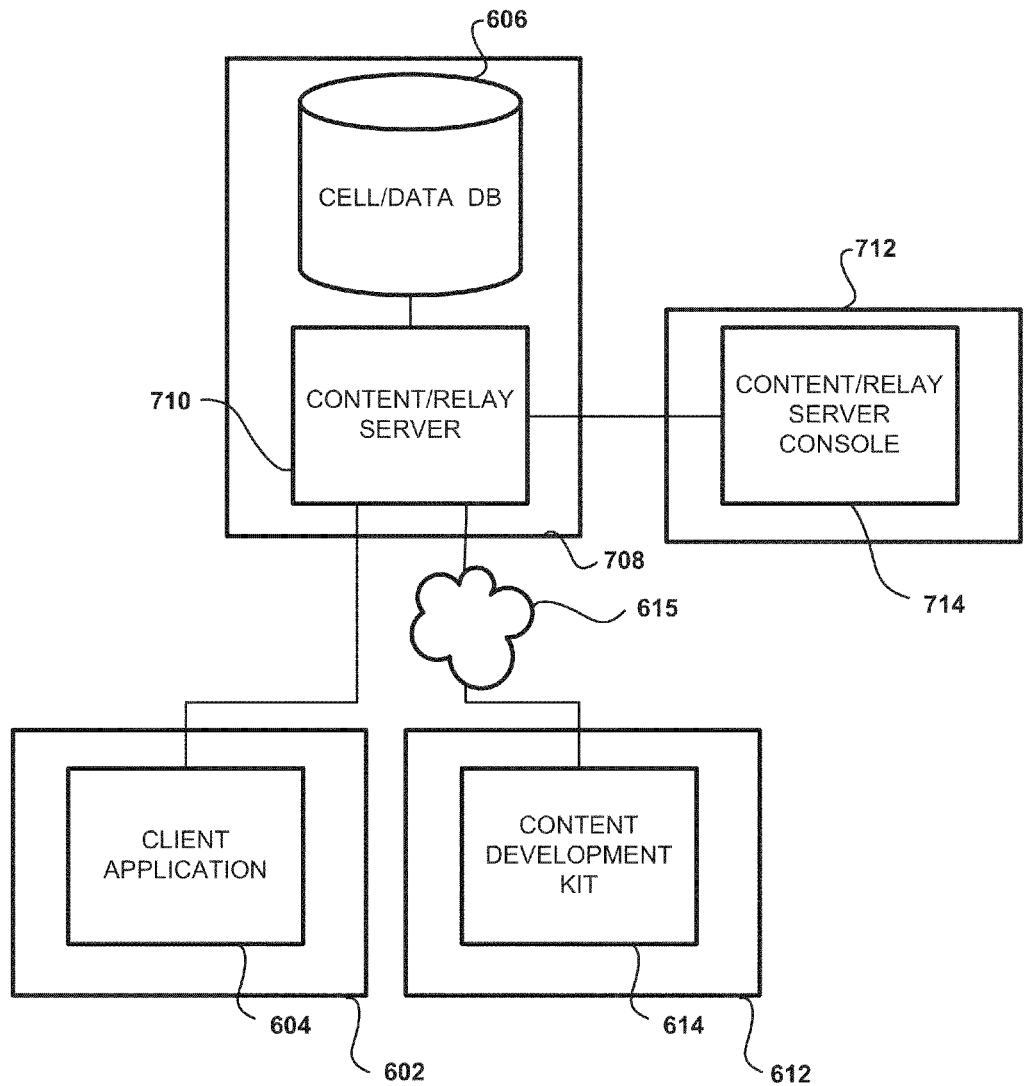
FIG. 7 is a block diagram illustrating a relay server system configuration according to one embodiment.

FIG. 7 illustrates a block diagram of a relay server system configuration. The relay server configuration 700 includes a relay/content server 710 in addition to the components in the client configuration 600. The relay/content server 710 operates in a relay server machine 708, which may include a server data storage device 706 for storing the cell/data database. The relay/content server 710 is connected to one or more client computing environments 602, for example, through a conventional network.

In this embodiment, data can be served from the centralized server data storage device 706, through the relay/content server 710 to multiple client computing environments 602. For example, cellularized environments 100 (e.g., world .viz files) can be populated using data from an internal database in the server data storage device 706 and the populated worlds can be made accessible to client computers 602 through a network.

In this embodiment, the CDK module 614 is preferably installed and operated on a separate content architect machine 212 and used by a content architect to create cellularized environments (e.g., as worlds or experiences) that are delivered to the client computers 602. In addition, a relay/content server console 714 may be provided for a server administrator to operate and maintain the relay/content server 710. The relay server console 714 may be included in the content architect machine 612 or in a separate server administrator machine 712.

One purpose of the relay server system configuration 700 is to provide a relay/content server 710 to support multiple client computing environments 602 with data that changes infrequently. The updates can generally be provided using the CDK module 614 or an alternative content architecting approach, e.g., external systems' APIs, templates, or the like. For example, one application using a relay server system configuration 700 includes a kiosk-based system. Kiosks embodying client viewer applications 104 perform the function of the client computing environments 602. Kiosks 602 can be located in multiple locations, e.g., shopping malls, chain stores, airport terminals, and the like. The user data displayed at the kiosks 602 through the cellular user interface 100 would generally only require weekly updates, e.g., special of the week, store product offering/catalog, or the like. The updates are performed through the CDK module 114 in a content architect machine 612. A content server console 714 allows a server administrator to update the cellular database 706 with modified world definition files from the content architect and/or updated user data. The data updates are delivered to the kiosks through a network. Alternatively, an RSS feed published by the stores is linked to the kiosk system 602 through a system API. The store related data is updated by updating the RSS feed which in turn is transformed into cell content updates through the API.

The relay server configuration 700 includes several advantages. For example, in addition to performing the centralized data repository function, the relay server 710 can also deliver functionality to the client computing environments 602. For example, depending on the cellularized environment configurations, the relay/content server 710 can download customized toolbars to the client computers 602 for the user to interact with particular types of data, e.g., audio/video reproduction controls for multimedia data.

3. Scheduled Data Update Configuration

Figure 8:
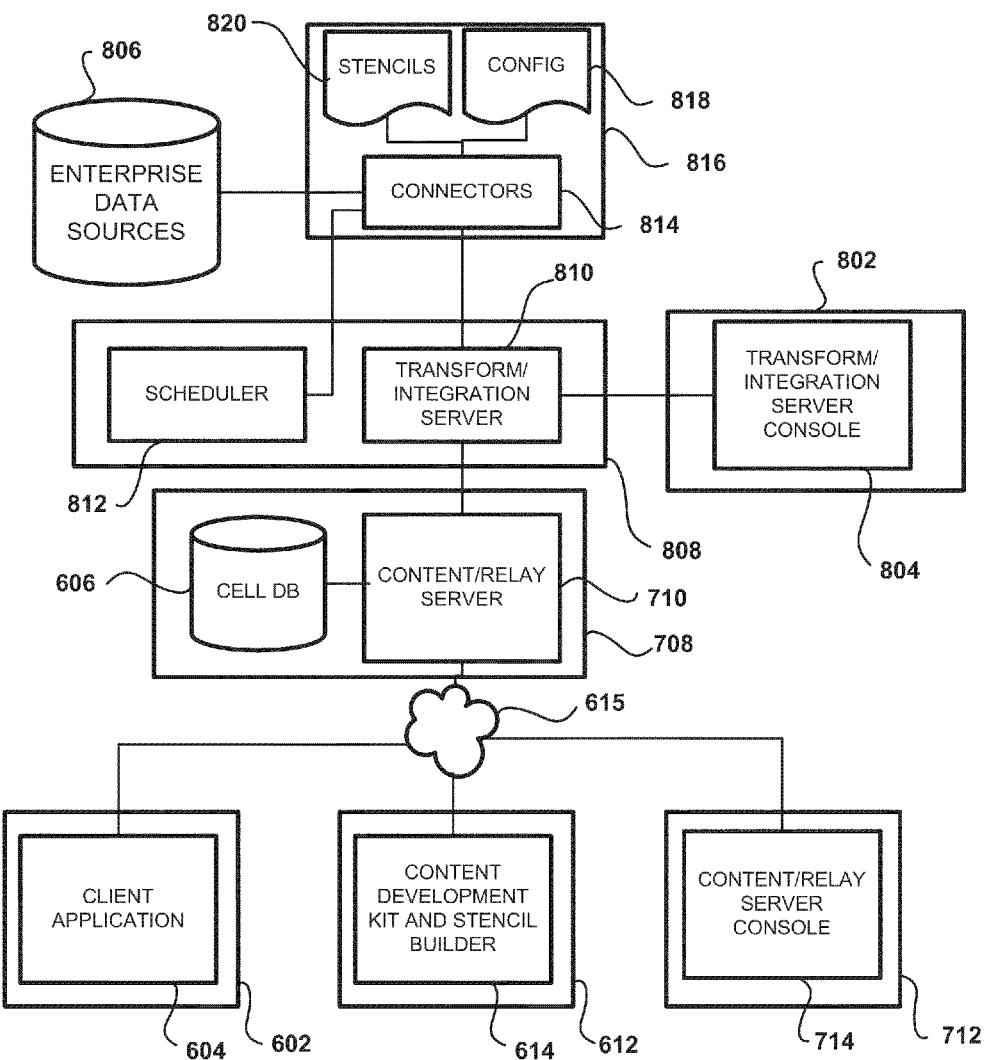
FIG. 8 is a block diagram illustrating a scheduled data update system configuration according to one embodiment.

Now referring to FIG. 8, a block diagram illustrating a sample scheduled data update system configuration is shown. In this embodiment, the scheduled data update configuration 800 includes similar components to those described with respect to the relay server configuration 700.

In addition, the relay/content server 710 is connected to a transform/integration server 810. The transform/integration server 810 connects to external information sources 806 and transforms the data into cells 101 for display through cellularized user interfaces 100. In one embodiment, the transform/integration server 810 operates in a transform/integration server machine 808. A transform/integration console 804 may be provided for a server administrator to maintain the transform/integration server machine 808 and associated network connections.

The transform/integration server 810 is connected to a set of connectors 814 in a connector machine 816. The connectors 814 are interfaces to external data sources 806, e.g., data bases, data feeds, broadcasts, and the like, to package the external user data into a cellularized format. Instructions on how to render the user data into a cellularized format for a cellular environment 100 are provided through a set of stencils 820 and configuration files 818 in the connector machine 816. For example, a set of connectors 814 are provided to interface with multiple external data sources 806. Each connector 814 establishes an interface to a single data source 806 to retrieve content data used for cell generation.

The transform/integration server 810 also includes a scheduler unit 812. The scheduler unit 812 provides a mechanism to deliver up-to-date content where the user data is updated at regular intervals. For example, a cellularized environment requiring a daily update of the data content may be implemented according to this embodiment. The scheduler unit 812 uses multiple data connectors 814 to support large batches of data updates. In addition, in this configuration 800, content data can be drawn from the customer's enterprise data sources 806, such as a large-scale database or other data repositories.

The scheduled data update configuration 800 includes several advantages. The scheduler unit 812 gives content architects the flexibility to have data updated for end users on a schedule that accommodates their business requirements. User data can be drawn directly from enterprise data sources 806 via the connectors 814, which can be customized to the data sources 806 of any particular enterprise.

4. Live Cell Configuration

Figure 9A:
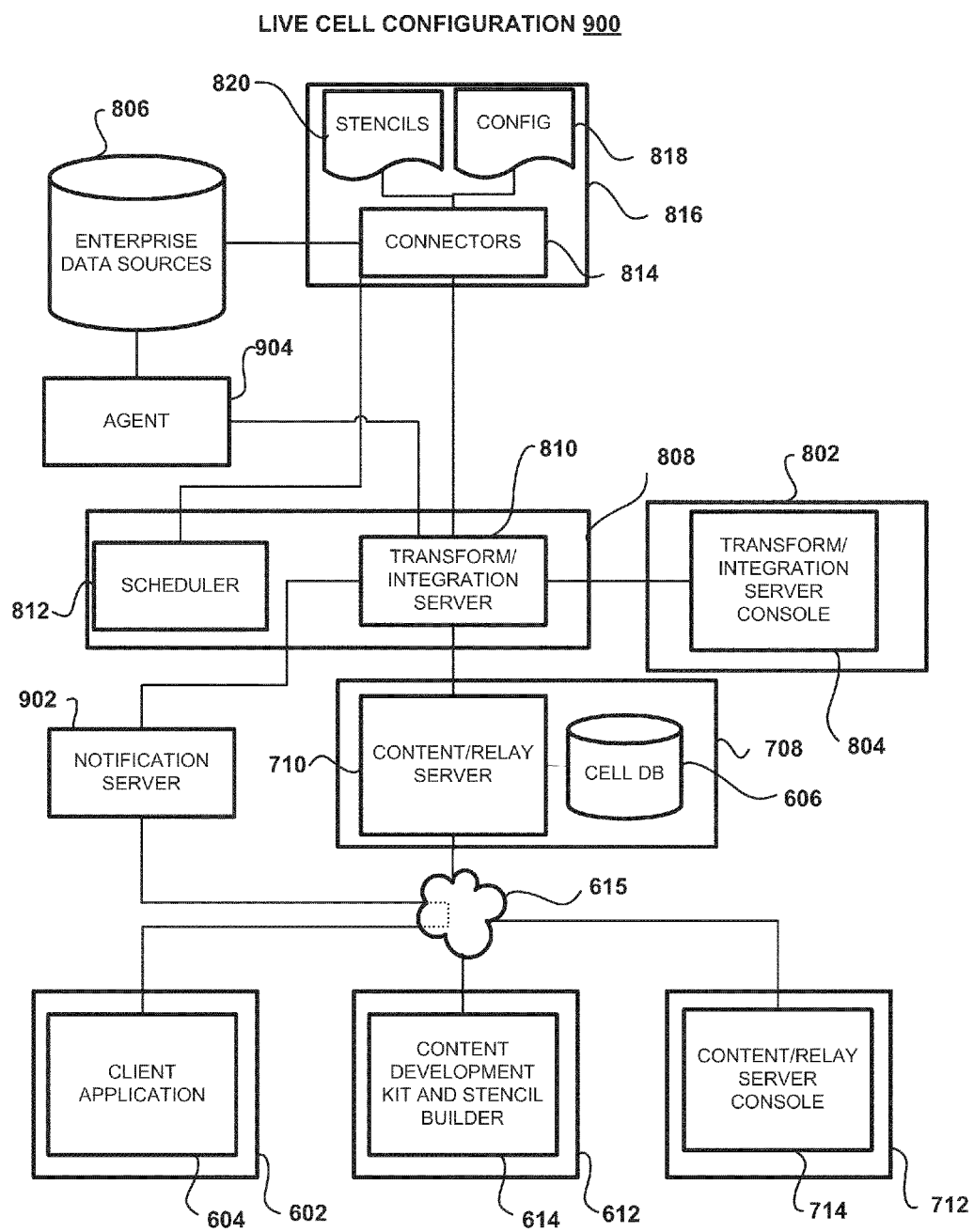
FIG. 9A is a block diagram illustrating a live cell system configuration according to one embodiment.

Now referring to FIG. 9A, a block diagram illustrating a sample live cell system configuration is shown. In this embodiment, the live cell system configuration 900 includes similar components to those described with respect to the scheduled data update configuration 800.

In many applications of the cellular user interface 100, it is important for the content data associated with specific cells (or views into the data) to be updated as soon as the underlying source data changes in the data source 706. For this purpose a notification mechanism is provided for data-driven updates of the content data. The notification mechanism includes a notification server 902 and a notification agent module 904. The notification server 902 is connected to the transform/integration server 810 and to the client computing environment 302. The transform/integration server 710 is also connected to a notification agent module 904 that interfaces with the data sources 806 to detect source data updates or other pre-determined content events and trigger corresponding updates in the cellularized environment 100.

The live cell configuration 600 allows a monitored cell 101, i.e., a live cell, to be updated in the viewer application 104 soon after the content associated with the cell 101 changes in the data source 806. This is done by having the viewer application 104 register these live cells (also called "high-priority" cells) with a notification server 902. The notification server 902 receives notifications from the notification agent module 904 when monitored data is updated in the data source 806. This arrangement ensures that the information associated with a high-priority or live cell 101 is updated promptly after it changes in the source database 806.

The live cell configuration 600 includes several advantages. For example, immediate updating of mission-critical information for end users is provided through the notification mechanism. This configuration also enables updated data to be drawn directly from enterprise data sources 806 via connectors 814, thus leveraging existing software architectures.

Data sources 806 may include any digital information from which a graphical display may be derived, including, without limitation, video data files or sources (e.g., digital television broadcasts, digital image databases, digital movie files (e.g., DVDs), and the like), Internet web pages, vector graphics data files (e.g., gaming graphics, map data files, satellite image files, and the like), any office application based file (e.g., Microsoft® Office Excel, Word, PowerPoint, Adobe® Portable Document Format ("pdf"), and the like), or text broadcast source (e.g., stock ticker, teletex, closed captioning, or the like)

Figure 9B:
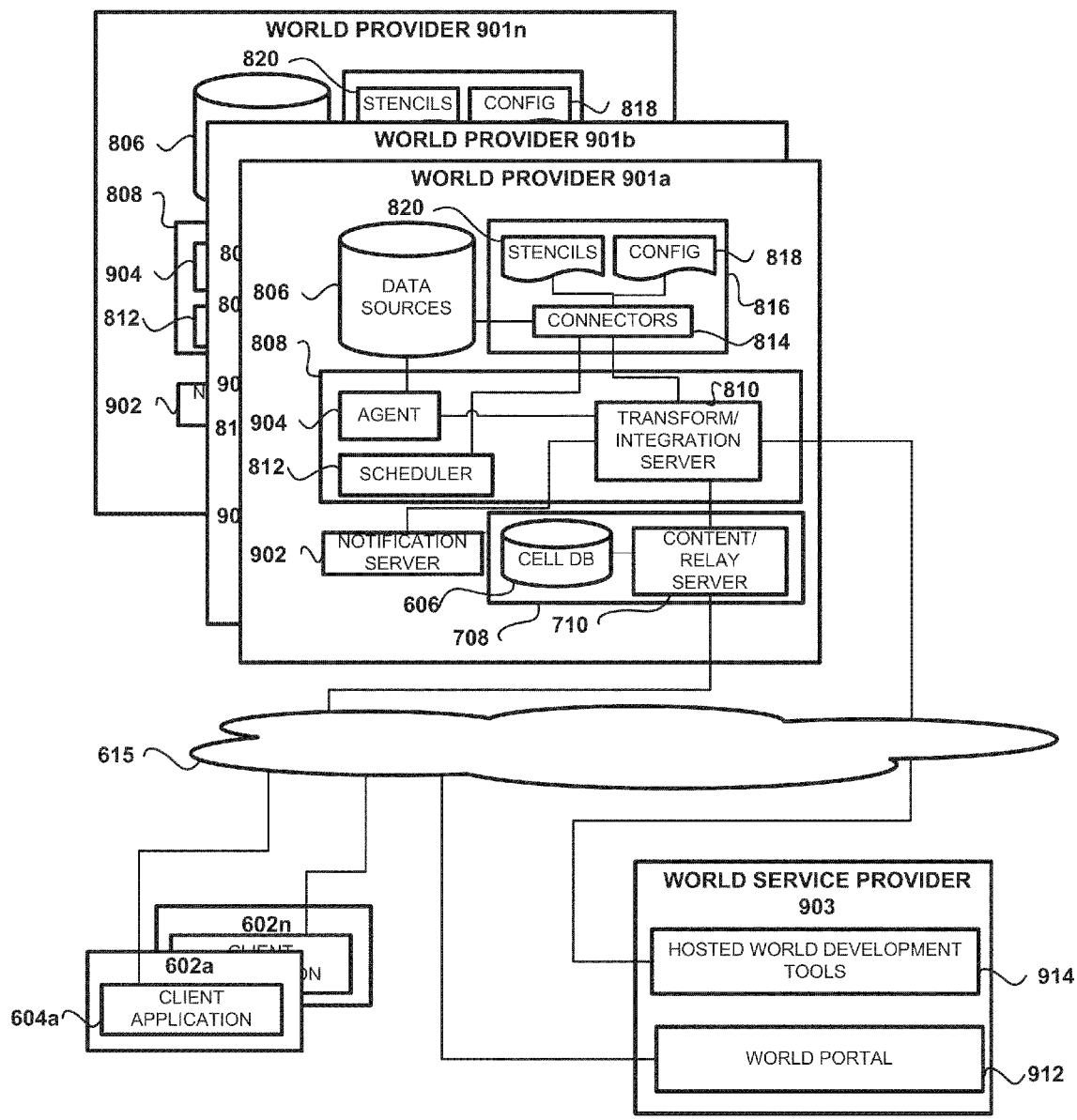
FIG. 9B is a block diagram illustrating a distributed world provider architecture according to one embodiment.

Now referring to FIG. 9B, a block diagram illustrating a distributed world provider architecture according to one embodiment is shown. In this embodiment any of the system architectures discussed above can be used by world providers 901. The world providers 901 use hosted world development tools 914 made available by the world service provider 903 through a data network 615, e.g., the Internet. For example CDKs, stencil builders, and the like may be hosted at a world service provider server 903 and remotely accessed by world developers to create or modify cellular environments 100 in any of multiple world provider 901 sites. In addition, support for development and maintenance of world provider 901 sites can also be made available as a hosted tool 914 from a world service provider 903.

In addition, the world service provider 903 may provide a world registration service through a world portal 912. The world providers 901 can register a location, such as a URL, accessible through a data network 615 to which client applications 604 can be directed by the world portal 912. Users can access the world portal 912, for example through a query in their viewer application 602, and get redirected to a content relay server 710 of a world provider 901.

Content Development and Delivery

Referring back to FIG. 2A, the visual proxy component 204 is generated for association with a cell 101 during the cell generation process. In the client configuration 600 system, a CDK module 614 may be used to associate data sources with the visual proxy component 204 of the cells 101 in an environment 100. For example, a CDK module application 614 as shown in FIG. 6B enables a content designer to select one of a plurality of geometric templates from a geometry configuration tab 614a. The CDK 614 may also enable the content designer to drag and drop image content into each cell 101 of the environment 100, for example through a file browser tab 614b. The drag and drop feature provides access to multimedia content in data files stored in the content developer system 612 or in the cell/data database 606. The CDK module 614 renders as visual representations 222 images from the selected multimedia data files. The CDK module 614 provides a preset number of zoom states 614c for the visual proxy component 204 of each cell 101. For each such zoom state, a visual representation 222 can be associated. As a default, the CDK 614 module 614 may automatically produce images of the source image file at different resolutions as visual representations 222 for each of the available levels of detail. However, different source data files can be associated with the visual representations 222 for each zoom state 614c.

Once the content developer generates the cellularized environment 100, it may be uploaded to the cell/data database 606 from where the user may access it for display in the user's viewer client application 604. The cell/data database 606 may be stored on a computer readable medium, such as a hard drive, floppy disk, optical disk, memory, memory card, or the like. In this embodiment, the content delivery to the user is predetermined by the content designer and limited to the data included in the world design, although subsequent updates are possible.

Dynamic generation of the cellularized environment 100 is also possible. The dynamic generation is enabled based on a set of content-specific frameworks or based on assembly models. In addition, user customization is possible through user credentials stored in the user data database 606. The content developer creates the frameworks and/or assembly models and establishes dynamic relationships between cells and variable content through the CDK or system APIs. This dynamic cellularized environment template is stored, for example, as an assembly model, in the cell/data database 606. The cellularized environment may be made up of proactive cells, which using the cellular frameworks or assembly models periodically regenerate the environment with updated content based on user interactions or content events. For example, one or more cells in the environment are associated with one or more data feeds, e.g., RSS data feeds, Atom data feeds, or the like. Responsive to changes in the data feeds, the cells dynamically regenerate their content and information to provide an updated result. The cell regeneration takes place as indicated in the assembly model or frameworks and may be modified based on user credentials to customize the resulting cellularized environment.

As shown with respect to FIG. 9A, the live cell update configuration 900 includes a content generation system for live data content update and delivery. Connectors 814 are provided for establishing connections to a plurality of data sources 806. The data sources 806 may include data bases, files, online data sources (e.g., web pages, graphics, video feeds, and the like), and the like.

Figure 10:
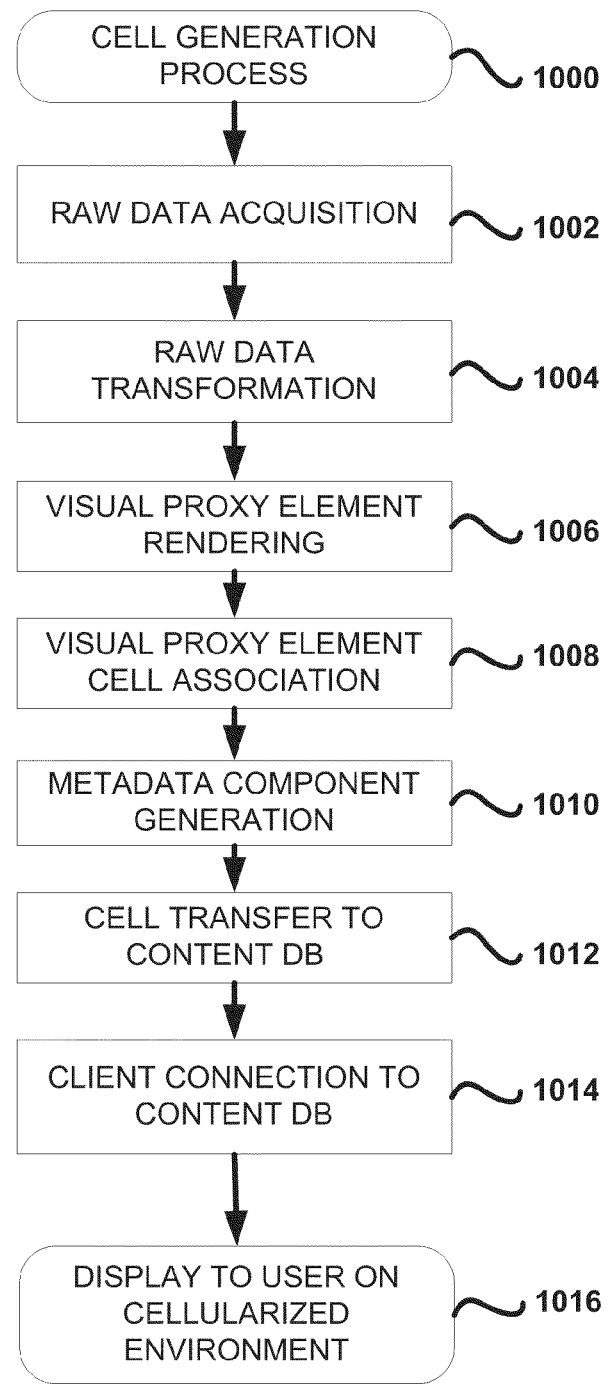
FIG. 10 is a flowchart illustrating a sample cell generation and delivery process according to one embodiment.

Referring now to FIG. 10, a flowchart illustrating a sample cell generation and delivery process according to one embodiment is shown. In this embodiment the connectors 806 acquire 1002 the raw data from the original data source 806 and transform 1004 it by generating a model that represents a view into the data. The model may include a several image proxy components according to different levels of detail for a particular cell. The model may be derived from a model template provided in stencils 820 and associated configuration files 818. For example, a stencil 820 may include a template cell description associated with a data source. One type of template is a static template, which predefines a specific arrangement of cells. For example, static templates can be created by positioning cells manually using a CDK 614. Another type of template is a dynamic template, which is built dynamically through queries to a database at a client computer environment 602 or to cellular database 606 at content server 710. For example, dynamic templates can be created at run-time by using computer algorithms to sort, group and position cells based on their metadata component 202.

The template cell description includes template feature descriptions 210 and required visual proxy elements 222. The associated configuration file indicates to the connector 814 how to populate the template with the raw data acquired from the data source 806. Based on the template and configuration file, visual proxy elements are rendered 1006 from the raw data and associated 1008 with the cell. For example, for a data source of financial information, a first zoom state may describe a particular cell background color with a title in large font that includes text acquired from the data source, e.g., a company stock ticker symbol. A second level may include a captured image from a company website, a third level includes the ticker symbol and daily price information derived from a stock ticker feed, the next level has a one-year historical price chart derived from an Excel file, and the like. In this embodiment, the stencil provides a shell template for the cell that is populated with the acquired data from various data sources. The data is applied to the template as indicated in the configuration file.

In one embodiment, the rendering 1006 is performed at the viewer client application hence raw data is provided in association with the cell for subsequent rendering at the client. In alternative embodiments, rendering 1006 is performed by rendering engines in the connector system 814, e.g., HTML rendered, vector graphics rendering engine, and the like. With respect to some data sources, e.g., multimedia data feeds, a link to the data source may be established for display of the actual data stream (e.g., streaming video, sound, text, or the like) directly from the data source.

In addition, the metadata component 202 of the cell is generated 1010 by the connector. The metadata feature description elements 210 are included in the cell template and are populated with acquired data from the data sources according to the instructions in the associated configuration file 818. For example, a query associated with a cell may be specified in the template with a variable value that is derived from the acquired data. The zoom state definitions 212 are provided associating 1008 the cell 101 to the associated visual representations 222 of the visual proxy component 204 generated by the connector 814. Similarly, information content feature definitions 210 may include keywords as tags in the cell definition template for which values are derived from the acquired data. In one embodiment, the metadata component 202 includes information regarding the source from which the cell content is derived. This information is also available for query execution as described above. In addition, in one embodiment, the metadata feature description elements 210, environment templates, and configuration files are dynamically associated with outside data inputs. For example, an RSS data feed may include inputs to one or more feature description elements 210, templates, or configuration files to dynamically vary cell generation. For example, the RSS feed may remotely provide updates to environment geometries, updated cell templates, and the like, without requiring coding for each particular system. FIG. 3B illustrates this feature showing a "record" geometry remotely applied to the spherical geometry of the cellularized environment 300 shown in FIG. 3A.

Once the cells are generated, they are transferred 1012 to the cell database 606 in the content/relay server system 708. Client computing environments 602 with client viewer applications 104 connect 1014 to the content/relay server 710 for access to the cell database 606 to populate the cellularized environments (e.g., worlds) displayed 1016 to the user. In one embodiment, the client viewer application 104 connects to the content/relay server 710 through a simple object access protocol ("SOAP") interface for the delivery of cells to the cellularized user interface.

Cellular Content Update

A cellular user interface system includes cell content update functionality. The cell content update functionality may be available through several update processes. Through these update processes, cell content, including metadata 202 and visual proxy 204 components can be updated to provide a highly dynamic user interface 100.

The cells 101 themselves may be proactive. Proactive cells can have their content dependent on or linked to dynamic data sources. Content events in those data sources trigger cell regeneration or update of the proactive cell content. For example, one or more cells in a cellularized environment are associated with a data feed, e.g., RSS data feed, Atom data feed, or the like. Responsive to changes in the data feed, the cells dynamically regenerate their visual proxies 204 and metadata 202 components to provide updated content. The cell regeneration takes place as indicated in an assembly model or a set of frameworks and may be modified based on user credentials to customize the resulting cellularized environment 100. Parameters in the metadata components 202 are conditioned on states of data supplied by the data feeds. When the state of the data in the data feeds changes, the parameters activated by user actions, e.g., zoom, clicking, or the like, access the changed states and regenerate their metadata 202 and/or visual proxy 204 components accordingly.

Figure 11:
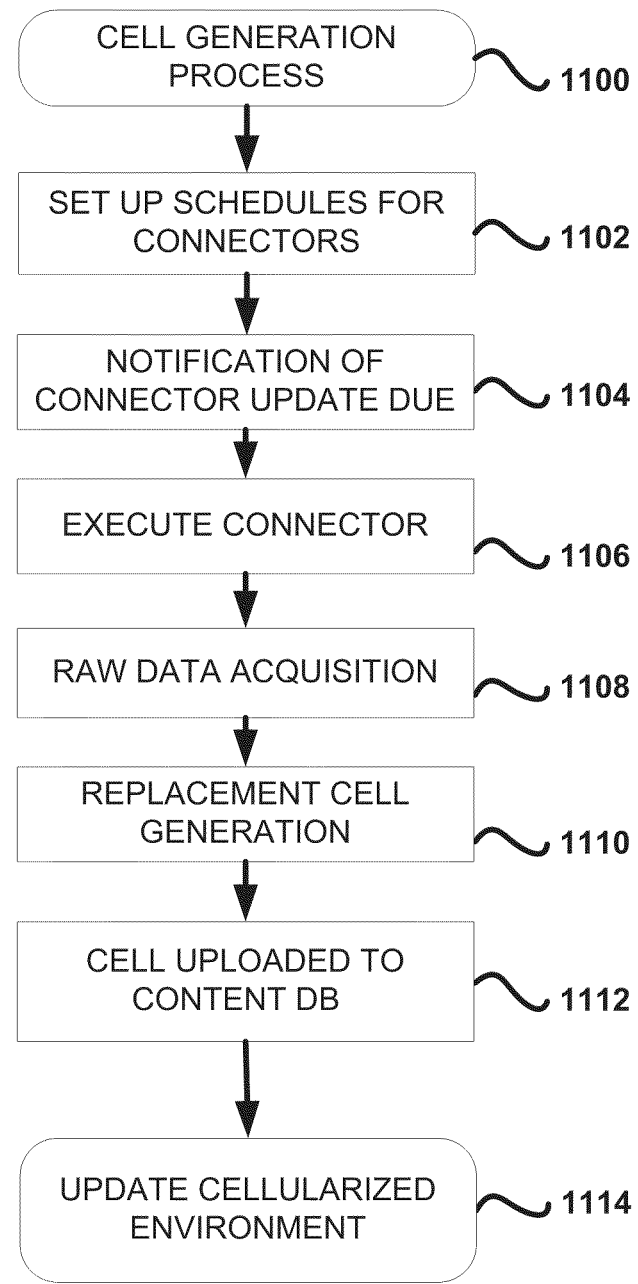
FIG. 11 is a flowchart of a sample scheduled cell updating process according to one embodiment.

In addition, a scheduled update process may be provided for updating cell content at regular scheduled periods. For example, a system architecture as shown in FIG. 8 is capable of supporting a scheduled content update. FIG. 11 illustrates such a scheduled update process with a flowchart of a sample scheduled cell updating process according to one embodiment. In this embodiment, the connectors 814 include information about the frequency with which the data of their associated data sources may change. For example, a stock ticker data source connector would include information regarding the cycle time for the data to stream through all the symbols of the associated market. Similarly, a daily digital newspaper connector includes information indicating the daily update time for the digital news, e.g., 2 A.M. Based on this information, a scheduler 812 sets up 1102 schedules for each connector 814 to trigger the acquisition of updated data according to the known update schedule.

The scheduler 812 notifies 1104 the integration server 810 that an update from a connector is due. The integration server 810 causes 1106 the connector to execute and acquire 1108 the updated content. For example, the updated cell content may be acquired 1108 and a new replacement cell 101 generated 1110 based on the stencils 820 and configuration files 818. The integration server 810 uploads 1112 the new cell content to the content server 710 where it becomes available to the client computing environments 602. The client applications 104 may periodically update 1114 or refresh the cells 101 in their cellularized environment 100 thereby displaying the updated content. Alternatively, updatable cells 100 are configured to cause the viewer application 104 to update their content upon user input, e.g., click. In addition, selection menu option in the viewer application 104 may include an update content option selectable by a user at any time causing the viewer application 104 to download updated cells from the content server 710.

Figure 12:
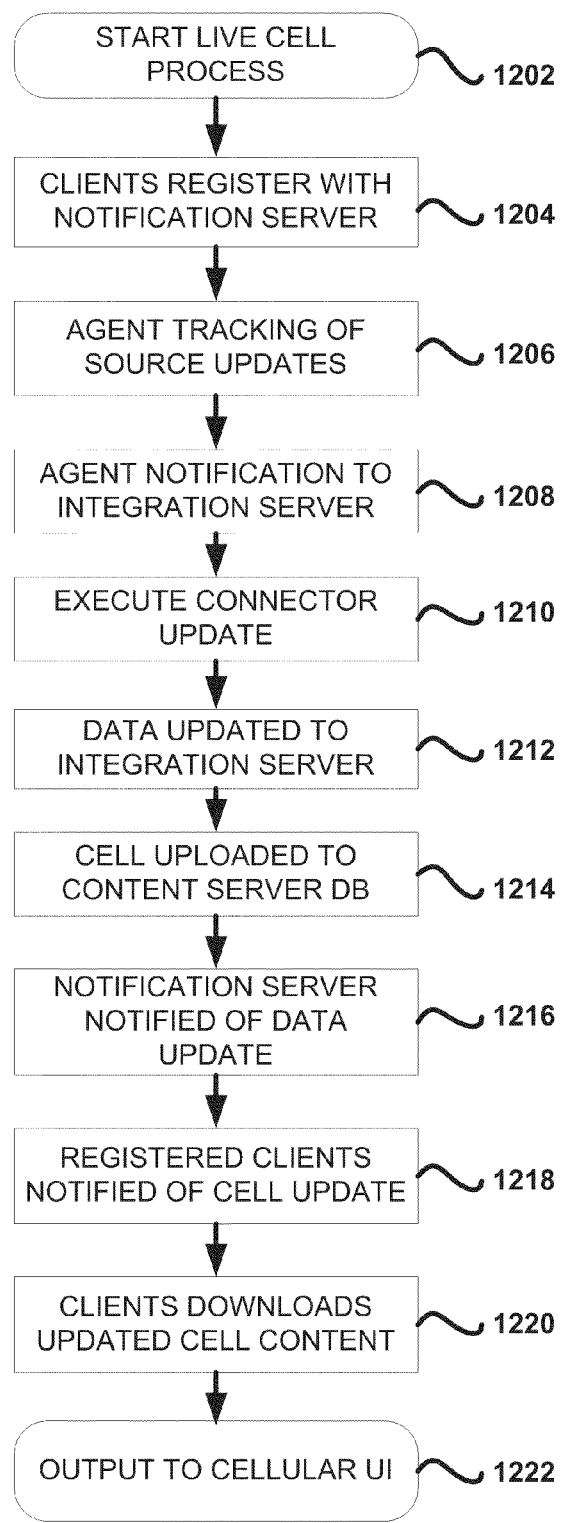
FIG. 12 is a flowchart illustrating a sample live cell updating process.

The cellularized user interface cell update feature may also include a live-cell functionality. Live-cell functionality allows the content of "high-priority" cells to be updated on the user interface as soon as the underlying data changes in the data source 806. Live-cell functionality is facilitated through a process as for example illustrated in FIG. 12. FIG. 12 shows a flowchart illustrating a sample live cell updating process. For ease of explanation this process is described with respect to the elements shown in FIG. 9A, however other configurations of system elements to accomplish the same function will be evident from this description.

In this embodiment, the process starts 1202 when a client or viewer application 104 receives a "live" or "high-priority" cell 101a. A cell 101a, through its metadata component 202, may indicate that it includes a live update feature. The client application 104 registers 1204 with a notification server 902, for example, via a TCP/IP protocol, to receive updates for the specified cell 101a. At the data source 806, an agent 904 tracks 1206 changes in the data being monitored directly from the source 806. Upon detecting a change in the monitored data, the agent 904 notifies 1208 an integration server 810, for example, via authenticated HTTP requests. The integration server 810, upon receipt of the notification, causes the corresponding connectors 814 to execute 1210 to acquire the updated data from the data source 806.

The updated cell data is acquired and transferred 1212 to the integration server 810. For example, the updated cell data may be acquired and a new replacement cell 101a generated based on the stencils 820 and configuration files 818 as described above. The integration server 810 uploads 1214 the new cell content to the content server 710 and notifies 1216 the notification server 902 of the updated cell content. The notification server 902 notifies 1218 registered client applications 104 that new content is available for the registered cell 101a. The registration process is available for any number of cells 101, thus the notification 1218 may related to multiple cells and may be broadcast to all or any subset of client applications 104, whether registered or not. The registered client applications 104, upon receipt of the update notification, download 1220 the new cell content from the content server 708, for example, using Simple Object Access Protocol ("SOAP"). The updated cell content is displayed 1222 in the cellularized user interface 100 according to the displayed world descriptions thereby providing continuously updated cell content.

The live-cell update process may be combined with the scheduled update process described above. Data known to periodically change at known time intervals is displayed in cells that are periodically updated according to the scheduled update process. Data that may vary at random time intervals is displayed in live cells updated based on monitored changes in the data. Moreover, the content generation process for all the cells in the cellularized environment may be performed in one of the scheduled update process or the live update process. That is, all the cells 101 in the cellularized environment 100 may be high priority cells. It should be noted that any combination of these update processes for any number of the cells 101 in a given cellularized environment 100 is possible and envisioned as part of the invention.

The updating feature is also capable of dynamically modifying environmental parameters of the cellularized user interface 100. The described update methodologies are also capable of modifying geometries for environment generation, frameworks, channel algorithms, views, display algorithms, and the like. For example, as described above with respect to FIGS. 7A, 7B, and 9, a sound equalization algorithm may be provided to shuffle the cell arrangement, location, sizing, and display orientation, and to vary the cellularized environment view according to the output of a music data feed. For this purpose, a conventional visual equalizer output is mapped to the cellularized environment parameters through the sound equalization algorithm by assigning parametric value changes for the different environment parameters to sound properties, e.g., frequency and associated amplitude of the sound data. As another example, environmental parameters can be associated with financial data, e.g., stock market prices, such that changes in share values within predetermined ranges trigger changes in the cellularized environment 100. For example, in a stock portfolio cellular environment 100a, upon reaching a predetermined price point, a cell 101a representing a company's stock transforms into a new cellular environment 100b with up-to-date data associated with the company, for example, including latest news, stock charts, information about executives, industry, and the like. The reaching price point is the content event that triggers the generation of a new environment 100b (or world) with updated cellular content generated based on an assembly model and user credentials.

The implementation of these techniques as well as similar adaptations falls within the scope of this invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-readable storage medium storing computer program code for executing on a processor, the computer program code when executed by the processor providing a graphical user interface (GUI) on a display device to display a plurality of graphical representations of content from a plurality of content sources, the GUI comprising:
 a first cell comprising:
  a first visual proxy component configured to display in the GUI a first graphical representation of a first content from a first content source; and
  a first metadata component configured to determine a first metadata comprising information describing the first content;
 a plurality of additional cells arranged in a geometrical arrangement in the GUI with respect to the first cell, each additional cell comprising:
  a visual proxy component configured to display in the GUI a graphical representation of an additional content from an additional content source;
  a metadata component configured to:
   perform a search of a data feed based on the first metadata to determine the additional content source;

automatically determine the additional content using the first metadata, the determining performed independent of a user input to the first cell received subsequent to rendering the first cell;

accessing the additional content from the additional content source;

determine an additional metadata comprising information describing the additional content; and wherein at least one of the additional cells configured to display in the GUI displays a graphical representation of different additional content compared to other additional cells.

2. The GUI of claim 1, wherein the metadata component of each additional cell is configured to provide the first metadata to the additional content source to determine the additional content.

3. The GUI of claim 2, wherein the additional content source comprises mappings between specific instances of additional content and specific instances of first metadata.

4. The GUI of claim 1, wherein the additional content of an additional cell comprises an advertisement related to the first content, based on the first metadata.

5. The GUI of claim 1, wherein the GUI is configured to arrange and display the graphical representations of the cells in the geometrical arrangement responsive to receiving a selection of the first cell.

6. The GUI of claim 5, wherein the selection comprises at least one from the group consisting of a zoom event, a click event, a keystroke event, and a mouse movement event.

7. The GUI of claim 1, wherein the GUI is configured to arrange and display the graphical representations of the cells in the geometrical arrangement responsive to a content event, the content event comprising a change in the first content provided by the first content source to the first cell.

8. The GUI of claim 1, wherein each metadata component is configured to use metadata to associate the content with the metadata component's cell.

9. The GUI of claim 1, wherein each visual proxy component is configured to adjust a shape of the graphical representation of content based on the metadata describing the content.

10. The GUI of claim 1, wherein the visual proxy component of an additional cell is configured to adjust a shape of the graphical representation of the additional content based on the geometrical arrangement including a position of the additional cell relative to the other cells.

11. The GUI of claim 1, wherein the GUI is configured to arrange the additional cells in a geometrical arrangement with respect to the first cell by displaying the graphical representations of the additional cells in relative proximity to the graphical representation of the first cell based on an extent of matching between the first metadata and the additional metadata.

12. The GUI of claim 11, wherein the GUI is further configured to:

display a second graphical representation of a second cell, the second cell being one of the additional cells, in proximity to the graphical representation of the first cell responsive to the first metadata and a second metadata of the second cell containing a common term; and display a third graphical representation of a third cell, the third cell being one of the additional cells, farther from the graphical representation of the first cell than the second graphical representation responsive to the first metadata and a third metadata of the third cell not containing the common term.

13. The GUI of claim 11, wherein the GUI is further configured to:

display a second graphical representation of a second cell, the second cell being one of the additional cells, at a first size responsive to the first metadata and a second metadata of the second cell containing a common term; and display a third graphical representation of a third cell, the third cell being one of the additional cells, at a second size smaller than the first size responsive to the first metadata and a third metadata of the third cell not containing the common term.

14. A method, executed by a computer system for providing a graphical user interface (GUI) on a display device, the method comprising:

accessing a first content from a first content source;

determining a first metadata comprising information describing the first content;

displaying a first cell comprising a graphical representation of the first content;

arranging a plurality of additional cells in a geometrical arrangement with respect to the first cell, the arranging for each cell comprising:

performing a search of a data feed based on the first metadata to determine an additional content source;

automatically determining an additional content using the first metadata, the determining performed independent of a user input to the first cell received subsequent to rendering the first cell;

accessing the additional content from the additional content source;

determining an additional metadata comprising information describing the additional content;

displaying an additional cell comprising a graphical representation of the additional content, each additional cell configured to display a graphical representation of different additional content from the other cells.

15. The method of claim 14, comprising providing the first metadata to the additional content source to determine the additional content.

16. The method of claim 15, wherein the additional content source comprises mappings between specific instances of additional content and specific instances of first metadata.

17. The method of claim 14, wherein the additional content of an additional cell comprises an advertisement related to the first content, based on the first metadata.

18. The method of claim 14, wherein arranging the additional cells comprises displaying the graphical representations of the additional cells in the geometrical arrangement responsive to receiving a selection of the first cell.

19. The method of claim 18, wherein the selection comprises at least one from the group consisting of a zoom event, a click event, a keystroke event, and a mouse movement event.

20. The method of claim 14, comprising accessing the first content from the first content source responsive to a content event, the content event comprising a change in the first content provided by the first content source to the first cell.

21. The method of claim 14, wherein metadata associates content with the cell in which it is displayed.

22. The method of claim 14, wherein displaying the graphical representations of the additional cells comprises adjusting a shape of each graphical representation based on the additional metadata.

23. The method of claim 14, wherein displaying the graphical representations of the additional cells comprises adjusting a shape of the graphical representation based on the geometrical arrangement including a position of the additional cell relative to the other cells.

24. The method of claim 14, wherein displaying the graphical representations of the additional cells comprises displaying graphical representations in relative proximity to the graphical representation of the first cell based on an extent of matching between the first metadata and the additional metadata.

25. The method of claim 24, comprising:
displaying a second graphical representation of a second cell, the second cell being one of the additional cells, in proximity to the graphical representation of the first cell responsive to the first metadata and a second metadata of the second cell containing a common term; and
displaying a third graphical representation of a third cell, the third cell being one of the additional cells, farther from the graphical representation of the first cell than the second graphical representation responsive to the first metadata and a third metadata of the third cell not containing the common term.

26. The method of claim 24, comprising:
displaying a second graphical representation of a second cell, the second cell being one of the additional cells, at a first size responsive to the first metadata and a second metadata of the second cell containing a common term; and
displaying a third graphical representation of a third cell, the third cell being one of the additional cells, at a second size smaller than the first size responsive to the first metadata and a third metadata of the third cell not containing the common term.

* * * * *